(12) United States Patent
Hirano et al.

(10) Patent No.: US 11,491,707 B2
(45) Date of Patent: Nov. 8, 2022

(54) MATERIAL FOR THREE-DIMENSIONAL MODELING, FILAMENT FOR THREE-DIMENSIONAL MODELING, ROLL OF THE FILAMENT, AND CARTRIDGE FOR THREE-DIMENSIONAL PRINTER

(71) Applicant: Mitsubishi Chemical Corporation, Tokyo (JP)

(72) Inventors: Akiko Hirano, Tokyo (JP); Shigeyuki Furomoto, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 170 days.

(21) Appl. No.: 16/941,586

(22) Filed: Jul. 29, 2020

(65) Prior Publication Data

US 2020/0398478 A1   Dec. 24, 2020

Related U.S. Application Data

(63) Continuation of application No. PCT/JP2019/002946, filed on Jan. 29, 2019.

(30) Foreign Application Priority Data

Feb. 2, 2018   (JP) .............................. JP2018-017467
Jun. 6, 2018   (JP) .............................. JP2018-108999

(51) Int. Cl.
*B29C 64/118* (2017.01)
*B29C 64/255* (2017.01)
(Continued)

(52) U.S. Cl.
CPC .......... *B29C 64/118* (2017.08); *B29C 64/255* (2017.08); *B29K 2023/12* (2013.01);
(Continued)

(58) Field of Classification Search
CPC ..... B29C 64/118; B29C 64/255; B29C 48/02; B29C 48/266; B29C 48/286;
(Continued)

(56) References Cited

U.S. PATENT DOCUMENTS 5,866,058 A   2/1999   Batchelder et al.
10,583,604 B2   3/2020   Yuyam
(Continued)

FOREIGN PATENT DOCUMENTS

CA   2232100 A   * 12/1998   ............... B05D 1/18
CN   104191620 A   12/2014
(Continued)

OTHER PUBLICATIONS

International Search Report dated Mar. 19, 2019 in PCT/JP2019/002946 (with English translation), 5 pages.
(Continued)

*Primary Examiner* — Joseph S Del Sole
*Assistant Examiner* — Guy F Mongelli
(74) *Attorney, Agent, or Firm* — Element IP, PLC

(57) ABSTRACT

Provided is a three-dimensional modeling material used for a fused deposition modeling three-dimensional printer. The three-dimensional modeling material has a multilayer structure and contains, in respective different layers, a thermoplastic resin (A) having a shear storage elastic modulus (G') of $1.00 \times 10^7$ Pa or less as measured at 100° C. and 1 Hz and
(Continued)

(A)

(B)

a thermoplastic resin (B) having a shear storage elastic modulus (G') of more than $1.00 \times 10^7$ Pa as measured at 100° C. and 1 Hz.

18 Claims, 11 Drawing Sheets

(51) Int. Cl.
  *B33Y 30/00* (2015.01)
  *B33Y 70/00* (2020.01)
  *B29K 23/00* (2006.01)
  *B29K 25/00* (2006.01)
  *B29K 55/02* (2006.01)

(52) U.S. Cl.
  CPC ...... *B29K 2025/04* (2013.01); *B29K 2055/02* (2013.01); *B29K 2995/0039* (2013.01); *B29K 2995/0041* (2013.01); *B29K 2995/0097* (2013.01); *B33Y 30/00* (2014.12); *B33Y 70/00* (2014.12)

(58) Field of Classification Search
  CPC .............. B29C 48/2888; B29C 48/304; B29C 2948/92904; B29C 48/05; B29C 48/21; B29C 48/865; B29C 64/209; B29C 2948/92104; B29C 2948/92333; B29C 2948/92571; B29C 2948/9259; B29K 2023/12; B29K 2025/04; B29K 2055/02; B29K 2995/0039; B29K 2995/0041; B29K 2995/0097; B33Y 30/00; B33Y 70/00; B33Y 70/10; B33Y 10/00; D01D 5/08; D01F 1/10; D01F 8/00
  See application file for complete search history.

(56) References Cited

U.S. PATENT DOCUMENTS

| | | | |
|---|---|---|---|
| 2010/0084778 A1* | 4/2010 | Mannschedel | A61C 13/30 264/16 |
| 2016/0122541 A1 | 5/2016 | Jaker | |
| 2016/0281267 A1* | 9/2016 | Wetzel | B29C 66/5221 |
| 2017/0173869 A1* | 6/2017 | Ishihara | B29C 35/02 |
| 2017/0298521 A1 | 10/2017 | Demuth et al. | |
| 2017/0320266 A1 | 11/2017 | Mikulak et al. | |
| 2018/0038015 A1 | 2/2018 | Sano et al. | |
| 2018/0093413 A1 | 4/2018 | Yuasa et al. | |
| 2019/0084283 A1* | 3/2019 | Fujita | B29C 45/14688 |

FOREIGN PATENT DOCUMENTS

| | | | | |
|---|---|---|---|---|
| JP | 2002500584 A | | | 1/2002 |
| JP | 2008194968 A | | | 8/2008 |
| JP | 2010516908 A | * | | 5/2010 |
| JP | 5920859 B2 | | | 5/2016 |
| JP | 2016193601 A | | | 11/2016 |
| JP | 2016193602 A | | | 11/2016 |
| JP | 2017065111 A | | | 4/2017 |
| JP | 2017094703 A | | | 6/2017 |
| WO | WO-2016171191 A1 | | | 10/2016 |

OTHER PUBLICATIONS

Combined Chinese Office Action and Search Report dated Oct. 28, 2021 in Patent Application No. 201980010975.3 (with English translation), 18 pages.

Extended European Search Report dated Feb. 23, 2021 in Application No. 19748379.5, 7 pages.

Office Action dated Mar. 22, 2022 in Japanese Patent Application No. 2019-569121 (with English machine translation), 8 pages.

* cited by examiner

Fig.4
(A)
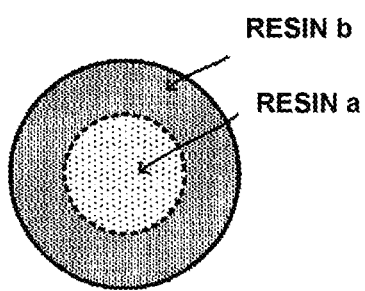
(B)
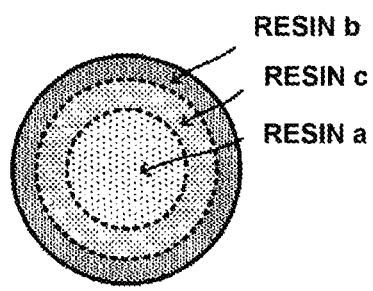
(C)
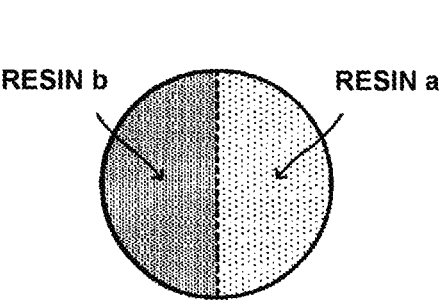
(D)
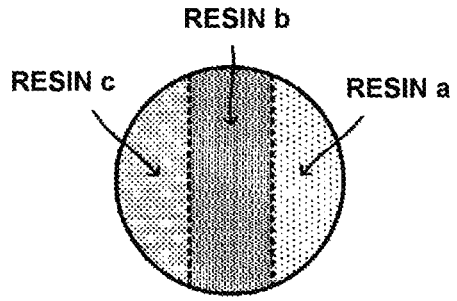

Fig.12
(A)
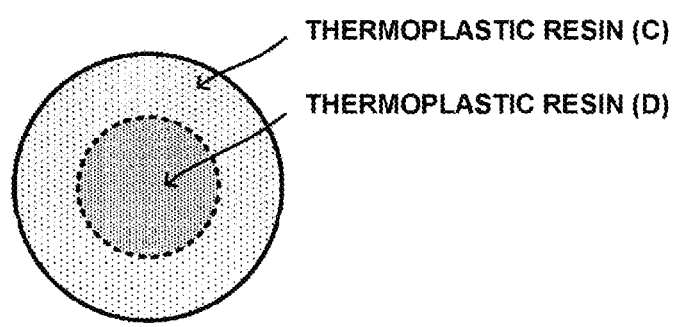
(B)
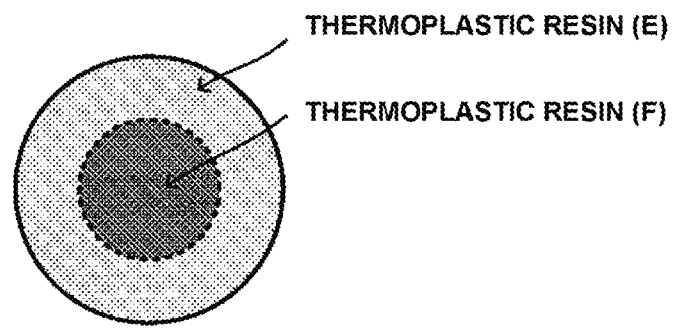

MATERIAL FOR THREE-DIMENSIONAL MODELING, FILAMENT FOR THREE-DIMENSIONAL MODELING, ROLL OF THE FILAMENT, AND CARTRIDGE FOR THREE-DIMENSIONAL PRINTER

TECHNICAL FIELD

The present invention relates to a three-dimensional modeling material and a three-dimensional modeling filament that are readily formable using a fused deposition modeling three-dimensional printer. The present invention also relates to a roll of the filament and to a cartridge for a three-dimensional printer.

BACKGROUND ART

Three-dimensional printers of various additive manufacturing types (such as the binder jetting type, the fused deposition modeling type, and the vat photopolymerization type) are commercially available.

In the fused deposition modeling method (hereinafter may be referred to as the FDM method), a raw material in the form of a filament formed of a thermoplastic resin is first inserted into an extrusion head and continuously extruded from a nozzle portion provided in the extrusion head onto an X-Y plane substrate in a chamber while being heat-fused.

The extruded resin is deposited on a previously deposited resin stack and fused thereto. As the extruded resin is cooled, it is integrated with the previously deposited resin stack and solidified. Since the FDM method is a simple system as described above, the use of the FDM method is being widespread.

Generally, in a material extrusion three-dimensional printer typified by an FDM three-dimensional printer, the extrusion step is repeated while the position of the nozzle relative to the substrate is raised in the Z-axis direction perpendicular to the X-Y plane, and a three-dimensional object similar to a CAD model is thereby built.

Generally, a thermoplastic resin such as a polylactic acid (hereinafter may be referred to as a "PLA resin") or an acrylonitrile-butadiene-styrene-based resin (hereinafter may be referred to as an "ABS resin") is preferably used as a raw material of the modeling material for the fused deposition modeling method from the viewpoint of workability and flowability (PTL 1). In addition to these resins, filaments of polypropylene (PP), elastomers, etc. are being put into practical use. In particular, the ABS resin and the PP are excellent in heat resistance and strength of a shaped article and are therefore widely used for industrial applications including modeling of products and modeling of manufacturing tools.

Problems with the ABS resin and the PP are that, since warpage during forming is large, the resin may peel off a modeling table (substrate) during modeling and it is difficult to obtain an intended shaped object with high dimensional accuracy.

In PTL 2, the temperature of a modeling area is controlled precisely to prevent warpage.

PTL 3 discloses that a filament having a multilayer structure is used to impart a plurality of functions to the filament.

PTL 4 discloses a three-dimensional printer that produces a three-dimensional shaped object having a plurality of functions by fusing and kneading a plurality of resins in an extruder and then extruding the resins.

PTL 1: Japanese Unexamined Patent Application Publication No. 2008-194968
PTL 2: Japanese Unexamined Patent Application Publication (Translation of PCT Application) No. 2002-500584
PTL 3: Japanese Unexamined Patent Application Publication No. 2016-193602
PTL 4: Japanese Patent No. 5920859

SUMMARY OF INVENTION

A problem with the method described in PTL 2 in which the temperature of the modeling area is precisely controlled is that the three-dimensional printer is large and expensive.

A three-dimensional printer in which the temperature of the modeling area cannot be controlled is inexpensive, but the warpage problem occurs.

When a filament having a multilayer structure is used as in PTL 3, the following problems arise.

(1) It is difficult to appropriately form a multilayered filament because of unstable ejection during production of the filament, difficulty in controlling the diameter of the filament to be constant, etc. In some cases, it is difficult to produce the filament itself.

(2) To maintain the multilayer structure, it is necessary to give consideration to the difference in viscosity between the resins and the interfacial adhesion between the resins, and therefore flexibility in combination of resins is low, so that it is difficult for the filament to exert the intended function.

(3) Even when an appropriate multilayer filament can be formed by combining specific resins, the resins may deteriorate due to thermal history during the multilayering process.

(4) To impart frangibility to a shaped object, a method using a filament having a multilayer structure with reduced interlayer adhesion may be effective. However, when the filament having the above structure is formed, it is feared that delamination, for example, may occur during production of the filament, during production of a cartridge including a roll of the filament, during unrolling of the filament from the cartridge, etc., so that the multilayer structure may be broken.

In the three-dimensional printer in PTL 4, since the resins are mixed together, it is difficult to impart an intended function to an intended portion of the three-dimensional shaped object. For example, it is difficult to impart adhesiveness only to the surface portion of the shaped object while heat resistance is imparted only to the interior of the shaped object.

Object and Summary of First Invention

An object of a first invention is to provide a three-dimensional modeling material and a three-dimensional modeling filament that have good heat resistance, can form a shaped article with high strength, have good workability, are prevented from warping during modeling without precise control of the temperature of the modeling area, and can be preferably used for industrial applications.

The inventor of the first invention has found that the above object can be achieved by a three-dimensional modeling material having a multilayer structure including a combination of specific resins.

The first invention is summarized in the following [1] to [14].

[1] A three-dimensional modeling material used for a fused deposition modeling three-dimensional printer, wherein the three-dimensional modeling material has a multilayer structure and contains, in respective different layers, a thermoplastic resin (A) having a shear storage elastic modulus (G') of $1.00 \times 10^7$ Pa or less as measured at 100° C. and 1 Hz and a thermoplastic resin (B) having a shear storage elastic modulus (G') of more than $1.00 \times 10^7$ Pa as measured at 100° C. and 1 Hz.

[2] The three-dimensional modeling material according to [1], wherein at least part of the surface of the three-dimensional modeling material is the layer containing the thermoplastic resin (A).

[3] The three-dimensional modeling material according to [2], wherein the thermoplastic resin (A) and the thermoplastic resin (B) are crystalline resins, and the crystallization temperature (Tc) of the thermoplastic resin (A) in a cooling process during differential scanning calorimetry is lower than the crystallization temperature (Tc) of the thermoplastic resin (B) in a cooling process during differential scanning calorimetry.

[4] The three-dimensional modeling material according to [2], wherein the thermoplastic resin (A) and the thermoplastic resin (B) are amorphous resins, and the glass transition temperature (Tg) of the thermoplastic resin (A) is lower than the glass transition temperature (Tg) of the thermoplastic resin (B).

[5] The three-dimensional modeling material according to any one of [1] to [4], wherein the tensile storage elastic modulus (E') of the thermoplastic resin (A) is 100 MPa or less as measured at 100° C. and 10 Hz.

[6] The three-dimensional modeling material according to any one of [1] to [5], wherein the tensile storage elastic modulus (E') of the thermoplastic resin (B) is more than 100 MPa as measured at 100° C. and 10 Hz.

[7] The three-dimensional modeling material according to any one of [1] to [6], wherein the thermoplastic resin (A) is at least one selected from styrene-based resins, olefin-based resins, and polyester-based resins.

[8] The three-dimensional modeling material according to any one of [1] to [7], wherein the thermoplastic resin (B) is at least one selected from styrene-based resins, olefin-based resins, and polyester-based resins.

[9] The three-dimensional modeling material according to any one of [1] to [8], wherein the thermoplastic resin (A) and the thermoplastic resin (B) are both styrene-based resins or olefin-based resins.

[10] A three-dimensional modeling filament comprising the three-dimensional modeling material according to any one of [1] to [9], wherein the filament has a diameter of 1.0 to 5.0 mm.

[11] The filament according to [10], wherein the multilayer structure is a core-sheath structure.

[12] The filament according to [11], wherein the core-sheath structure has a core portion that is 10% or more of the diameter of the filament.

[13] A roll of the three-dimensional modeling filament according to any one of [10] to [12].

[14] A cartridge for a three-dimensional printer, comprising the three-dimensional modeling filament according to any one of [10] to [12] and a container that houses the three-dimensional modeling filament.

Object and Summary of Second Invention

An object of a second invention is to solve the problems (1) to (4) when a three-dimensional modeling material having a multilayer structure is used and to provide a three-dimensional printer and a three-dimensional shaped object production method that can impart an intended function to an intended portion of a three-dimensional shaped object to be obtained.

The inventor of the second invention has recognized that, when a filament having a multilayer structure is used for a material extrusion process, the multilayer structure is maintained even after the filament has been ejected from a nozzle as molten resin, i.e., the filament is drawn and reduced in diameter while the multilayer structure is maintained. The inventor has found that this allows an intended function to be imparted to an intended portion of the three-dimensional shaped object and the object of the second invention can thereby be achieved.

The second invention is summarized in the following [1] to [10].

[1] A material extrusion-type three-dimensional printer including at least one nozzle, wherein the at least one nozzle has the function of ejecting a plurality of molten resins stacked one on another.

[2] The three-dimensional printer according to [1], wherein the at least one nozzle has a mechanism for stacking the plurality of molten resins to form a molten resin composite having a multilayer structure in a cross section orthogonal to a flow direction and then ejecting the molten resin composite.

[3] The three-dimensional printer according to [1] or [2], wherein the at least one nozzle includes a plurality of inlets for introducing the molten resins, a merging portion for merging the plurality of molten resins introduced from the plurality of inlets to form the molten resin composite having the multilayer structure in the cross section orthogonal to the flow direction, and an ejection port for ejecting the molten resin composite passing through the merging portion.

[4] A three-dimensional shaped object production method using a material extrusion process, the method including the step of supplying a plurality of resins to a nozzle, the step of stacking the plurality of molten resins inside the nozzle, and the step of ejecting the plurality of stacked molten resins from the nozzle.

[5] The three-dimensional shaped object production method according to [4], the method further including the step of stacking the plurality of molten resins inside the nozzle to form a molten resin composite having a multilayer structure in a cross section orthogonal to a flow direction.

[6] The three-dimensional shaped object production method according to [4] or [5], wherein at least two resins having respective different shear storage elastic moduli (G') measured at 100° C. and 1 Hz are used.

[7] The three-dimensional shaped object production method according to any of [4] to [6], wherein at least two resins having respective different glass transition temperatures (Tg's) are used.

[8] The three-dimensional shaped object production method according to any of [4] to [7], wherein at least two resins having respective different crystallization heat quantities (ΔHc) are used.

[9] The three-dimensional shaped object production method according to any of [4] to [8], wherein at least two resins having respective different tensile storage elastic moduli (E') measured at 25° C. and 10 Hz are used.

[10] The three-dimensional shaped object production method according to any of [4] to [9], wherein at least two resins containing respective different additives and/or an additive in different amounts are used.

Advantageous Effects of Invention

The first invention provides a three-dimensional modeling material and a three-dimensional modeling filament that exhibit good formability in a fused deposition modeling three-dimensional printer.

Specifically, the first invention can provide a three-dimensional modeling material and a three-dimensional modeling filament that are prevented from warping during modeling without precise control of the temperature of a modeling area, have high heat resistance enough to prevent deformation due to heat during modeling, and can be preferably used for industrial applications.

In the second invention, the plurality of resins are separately supplied to one nozzle. The molten resins are stacked inside the nozzle, and a desired multilayer structure can thereby be formed. Therefore, in the second invention, it is unnecessary that a modeling material having a multilayer structure be used upstream of the nozzle. Specifically, not only single-layer filaments but also irregularly shaped materials such as pellets can be used as the modeling materials. Therefore, various resins that were not usable for filaments having a multilayer structure can be widely used, and an intended function can be imparted to an intended position of a three-dimensional shaped object.

BRIEF DESCRIPTION OF DRAWINGS

FIG. 4 shows schematic diagrams illustrating examples of a cross-sectional shape of a plurality of resins (a molten resin composite) stacked inside the nozzle.

FIG. 12 shows schematic diagrams showing preferred examples of physical properties of a plurality of resins stacked inside a nozzle 10.

DESCRIPTION OF EMBODIMENTS

Figure 1:
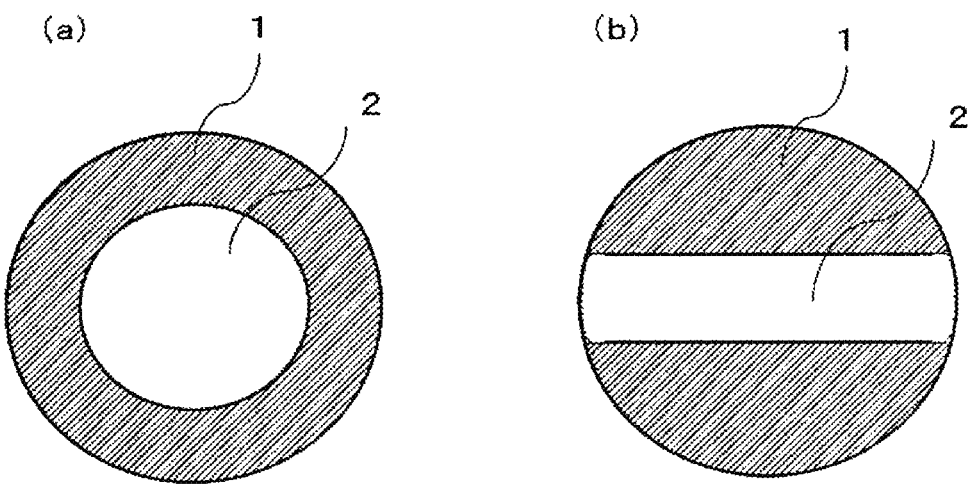
FIG. 1 shows schematic diagrams illustrating a multilayer structure in the three-dimensional modeling material of the first invention.

Embodiments of the present invention will be described in detail.

The present invention is not limited to the following description and can be embodied in various modified modes without departing from the scope of the invention.

In the present description, an expression including "to" between numerical values or physical property values is used to indicate a range including these values sandwiching the "to."

Embodiments of First Invention

[Three-Dimensional Modeling Material]

The three-dimensional modeling material of the first invention is a three-dimensional modeling material used for a fused deposition modeling three-dimensional printer and is characterized in that the three-dimensional modeling material has a multilayer structure and includes, in respective different layers, a thermoplastic resin (A) having a shear storage elastic modulus (G') of $1.00 \times 10^7$ Pa or less as measured at 100° C. and 1 Hz and a thermoplastic resin (B) having a shear storage elastic modulus (G') of more than $1.00 \times 10^7$ Pa as measured at 100° C. and 1 Hz.

From the viewpoint of interlayer adhesion (Z-axis strength) in a three-dimensional shaped object to be obtained, it is preferable that at least part of the surface of the three-dimensional modeling material of the first invention is a layer containing the thermoplastic resin (A).

[Crystallization Temperatures (Tc) of Thermoplastic Resin (A) and Thermoplastic Resin (B)]

When the thermoplastic resin (A) and the thermoplastic resin (B) are crystalline resins, it is preferable, from the viewpoint of the interlayer adhesion (Z-axis strength) in the three-dimensional shaped object to be obtained, that the crystallization temperature (Tc) of the thermoplastic resin (A) in a cooling process during differential scanning calorimetry is lower than the crystallization temperature (Tc) of the thermoplastic resin (B) in a cooling process during differential scanning calorimetry.

Specifically, from the viewpoint of the Z-axis strength of the shaped object, the Tc of the thermoplastic resin (A) is preferably 100° C. or lower and more preferably 90° C. or lower. From the viewpoint of the heat resistance of the shaped object, the Tc of the thermoplastic resin (A) is preferably 30° C. or higher and more preferably 50° C. or higher.

From the viewpoint of the heat resistance of the shaped object, the Tc of the thermoplastic resin (B) is preferably 100° C. or higher and more preferably 110° C. or higher. The upper limit of the Tc of the thermoplastic resin (B) is not particularly specified. However, from the viewpoint of formability, the Tc of the thermoplastic resin (B) is preferably 200° C. or lower and more preferably 150° C. or lower.

Preferably, the Tc of the thermoplastic resin (A) is lower by 10° C. or more, for example, about 20 to about 80° C., than the Tc of the thermoplastic resin (B).

A method for measuring the crystallization temperatures (Tc) of the thermoplastic resin (A) and the thermoplastic resin (B) in a cooling process during differential scanning calorimetry is as described later in Examples.

[Glass transition temperatures (Tg) of thermoplastic resin (A) and thermoplastic resin (B)]

When the thermoplastic resin (A) and the thermoplastic resin (B) are amorphous resins, it is preferable, from the viewpoint of the interlayer adhesion (Z-axis strength) in the three-dimensional shaped object to be obtained, that the glass transition temperature (Tg) of the thermoplastic resin (A) is lower than the glass transition temperature (Tg) of the thermoplastic resin (B).

Specifically, from the viewpoint of the Z-axis strength of the shaped object, the Tg of the thermoplastic resin (A) is preferably 95° C. or lower and more preferably 90° C. or lower. From the viewpoint of the heat resistance of the shaped object, the Tg of the thermoplastic resin (A) is preferably 30° C. or higher and more preferably 50° C. or higher.

From the viewpoint of the heat resistance of the shaped object, the Tg of the thermoplastic resin (B) is preferably 95° C. or higher and more preferably 100° C. or higher. The upper limit of the Tg of the thermoplastic resin (B) is not particularly specified. However, from the viewpoint of formability, the Tg of the thermoplastic resin (B) is preferably 180° C. or lower and more preferably 150° C. or lower.

Preferably, the Tg of the thermoplastic resin (A) is lower by 5° C. or more, for example, about 10 to about 50° C., than the Tg of the thermoplastic resin (B).

A method for measuring the glass transition temperatures (Tg) of the thermoplastic resin (A) and the thermoplastic resin (B) is as described later in Examples.

[Thermoplastic Resin (A)] (Physical Properties)

In the thermoplastic resin (A) used in the three-dimensional modeling material of the first invention, the shear storage elastic modulus (G') measured at 100° C. and 1 Hz is $1.00 \times 10^7$ Pa or less, preferably $0.90 \times 10^7$ or less, more preferably $0.80 \times 10^7$ or less, and still more preferably $0.60 \times 10^7$ or less.

It is preferable that the G' of the thermoplastic resin (A) is equal to or less than the above upper limit because warpage during modeling using the three-dimensional modeling material can be prevented. Specifically, when the shear storage elastic modulus (G') of the thermoplastic resin (A) that is measured at 100° C. and 1 Hz is equal to or less than the above upper limit, the difference between the temperature at which the resin ejected from a nozzle of a 3D printer solidifies during modeling and modeling atmosphere temperature is small, and therefore shrinkage stress due to linear expansion after solidified is small, so that warpage may be prevented. The G' of the thermoplastic resin (A) is generally $0.001 \times 10^7$ Pa or more.

In the present description, to measure the storage elastic moduli, any commonly known methods may be used. No particular limitation is imposed on the measurement conditions. Specifically, it is preferable to perform the measurement under the conditions described later in Examples.

No particular limitation is imposed on the composition of the thermoplastic resin (A) having the above-described shear storage elastic modulus (G'), as described later. The thermoplastic resin (A) may be at least one selected from styrene-based resins, olefin-based resins, polylactic acid (PLA), and polyester-based resins such as amorphous polyester resins (PETG). The above G' can be achieved by appropriately selecting the types of monomers forming these resins or adding rubber particles. It is preferable to select a styrene-based resin or an olefin-based resin as a main component because of their low hygroscopicity and high shock resistance. In this case, the main component is a component contained in an amount of 50 wt % or more in the thermoplastic resin (A).

From the viewpoint of preventing warpage during modeling, the tensile storage elastic modulus (E') of the thermoplastic resin (A) that is measured at 100° C. and 10 Hz is preferably 100 MPa or less, more preferably 70 MPa or less, and still more preferably 50 MPa or less. From the viewpoint of the heat resistance of the shaped object and the heat resistance during modeling, the E' of the thermoplastic resin (A) is preferably 1 MPa or more.

The tensile storage elastic modulus (E') measured at 100° C. and 10 Hz can be adjusted by changing the composition of the resin, copolymerization ratios, etc.

From the viewpoint of the room temperature strength of the three-dimensional modeling material and the shaped object to be obtained, prevention of blocking of the three-dimensional modeling material, and its slipperiness, the tensile storage elastic modulus (E') of the thermoplastic resin (A) that is measured at 30° C. and 10 Hz is preferably 100 MPa or more, more preferably 150 MPa or more, and still more preferably 200 MPa or more. The upper limit of the E' is generally about 5000 MPa or less.

The tensile storage elastic modulus (E') measured at 30° C. and 10 Hz can be adjusted by changing the composition of the resin, copolymerization ratios, etc.

(Styrene-Based Resin)

The thermoplastic resin (A) may be a resin containing a styrene-based resin.

The styrene-based resin is a resin having at least a structural unit derived from an aromatic vinyl-based monomer and is preferably a resin having a structural unit derived from styrene. The styrene-based resin may optionally have a structural unit derived from a vinyl cyanide-based monomer, an unsaturated carboxylic acid alkyl ester-based monomer, a conjugated diene-based monomer, another vinyl-based monomer, etc.

The styrene-based resin can be obtained by subjecting a monomer mixture containing the aromatic vinyl-based monomer and optionally containing the vinyl cyanide-based monomer, the unsaturated carboxylic acid alkyl ester-based monomer, the conjugated diene-based monomer and/or an additional vinyl-based monomer that is copolymerizable with the above monomers to well-known bulk polymerization, bulk-suspension polymerization, solution polymerization, precipitation polymerization, or emulsion polymerization.

No particular limitation is imposed on the aromatic vinyl-based monomer, and specific examples thereof include styrene, α-methylstyrene, o-methylstyrene, p-methylstyrene, o-ethylstyrene, p-ethylstyrene, and p-t-butylstyrene. Of these, styrene or α-methylstyrene is preferably used. One or two or more of them may be used. Among the monomer components forming the styrene-based resin, the aromatic vinyl-based monomer is contained in an amount of preferably 20 wt % or more and more preferably 50 wt % or more.

No particular limitation is imposed on the vinyl cyanide-based monomer, and specific examples thereof include acrylonitrile, methacrylonitrile, and ethacrylonitrile. Of these, acrylonitrile is preferably used. One or two or more of them may be used. One or two or more of them may be used.

No particular limitation is imposed on the unsaturated carboxylic acid alkyl ester-based monomer, and preferred examples thereof include esters of alcohols having 1 to 20 carbon atoms and (meth)acrylic acid. These esters may have a substituent, and examples of the substituent include a hydroxy group and chlorine.

Specific examples of the unsaturated carboxylic acid alkyl ester-based monomer include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 2-chloroethyl (meth)acrylate, 2-hydroxyethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate. One or two or more of them may be used. The "(meth)acrylic acid" as used herein means acrylic acid or methacrylic acid.

No particular limitation is imposed on the conjugated diene-based monomer, and examples thereof include 1,3-butadiene, isoprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, and chloroprene. The conjugated diene-based monomer is preferably 1,3-butadiene, isoprene, or 1,3-pentadiene and more preferably 1,3-butadiene or isoprene. One or two or more of them may be used.

No particular limitation is imposed on the additional vinyl-based monomer so long as it is copolymerizable with the aromatic vinyl-based monomer and with the vinyl cyanide-based monomer, the unsaturated carboxylic acid alkyl ester-based monomer, and the conjugated diene-based monomer that are used optionally.

Specific examples of the additional vinyl-based monomer include the following monomers:

maleimide-based monomers such as N-methylmaleimide, N-ethylmaleimide, N-cyclohexylmaleimide, and N-phenylmaleimide;

vinyl-based monomers having a carboxyl group or an anhydrous carboxyl group such as acrylic acid, methacrylic acid, maleic acid, monoethyl maleate, maleic anhydride, phthalic acid, and itaconic acid;

vinyl-based monomers having a hydroxy group such as 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4,4-dihydroxy-2-butene;

vinyl-based monomers having an amino group or a derivative thereof such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, and p-aminostyrene; and vinyl-based monomers having an oxazoline group such as 2-isopropenyl-oxazoline, 2-vinyl-oxazoline, 2-acryloyl-oxazoline, and 2-styryl-oxazoline.

One or two or more of them may be used.

No limitation is imposed on the molecular weight of the styrene-based resin (hereinafter may be referred to as "styrene-based resin (A)") used for the thermoplastic resin (A). However, from the viewpoint of extrusion stability when a filament obtained using the three-dimensional modeling material is produced and from the viewpoint of obtaining mechanical strength necessary for collecting the filament by winding it around a bobbin, the weight average molecular weight (Mw) of the styrene-based resin is preferably 50,000 or more and more preferably 80,000 or more. From the viewpoint of further reducing the low temperature melt viscosity of the filament obtained using the modeling material, the weight average molecular weight (Mw) of the styrene-based resin (A) is preferably 400,000 or less.

A more preferred weight average molecular weight (Mw) of the styrene-based resin (A) is as described later.

The weight average molecular weight as used herein is a polystyrene-equivalent weight average molecular weight measured by GPC using chloroform as a solvent.

Specific examples of the styrene-based resin (A) used in the three-dimensional modeling material of the present invention include acrylonitrile-butadiene-styrene (ABS) resins, methyl methacrylate-butadiene-styrene (MBS) resins, and butadiene-styrene-based resins.

Specific examples of the ABS resins include HF-3 and EX19C manufactured by Techno-UMG Co., Ltd. and GT-R-61A manufactured by Denka Company Limited.

Examples of the MBS resins include ESTYRENE MBS manufactured by NIPPON STEEL & SUMIKIN CHEMICAL Co., Ltd. and CLEAREN TH-11 manufactured by Denka Company Limited.

Examples of the butadiene-styrene-based resin include CLEAREN 730L manufactured by Denka Company Limited.

Preferably, a monomer for the styrene-based resin (A) is selected such that the shear storage elastic modulus (G') of the thermoplastic resin (A) that is measured at 100° C. and 1 Hz is $1.00 \times 10^7$ Pa or less.

For example, it is preferable that the styrene-based resin (A) contains a structural unit derived from an unsaturated carboxylic acid alkyl ester-based monomer. In particular, a structural unit derived from a (meth)acrylate is more preferable. From the viewpoint of achieving the target G', it is still more preferable that the styrene-based resin (A) contains a structural unit derived from at least one selected from the group consisting of acrylates in which a hydrocarbon group derived from an alcohol has 1 to 20 carbon atoms and methacrylates in which a hydrocarbon group derived from an alcohol has 2 to 20 carbon atoms. From the viewpoint of achieving the target G' even when the copolymerization ratio is low, it is particularly preferable that the styrene-based resin (A) contains a structural unit derived from an acrylate in which a hydrocarbon group derived from an alcohol has 1 to 20 carbon atoms.

Specific examples of the (meth)acrylate include methyl methacrylate, ethyl methacrylate, butyl methacrylate, 2-ethylhexyl methacrylate, methyl acrylate, ethyl acrylate, butyl acrylate, and 2-ethylhexyl acrylate. In particular, acrylates in which a hydrocarbon group derived from an alcohol has 1 to 20 carbon atoms and methacrylates in which a hydrocarbon group derived from an alcohol has 2 to 20 carbon atoms are preferred. One or two or more of them may be used.

From the viewpoint of achieving the target Tg even when the copolymerization ratio is low, the styrene-based resin (A) is more preferably methyl acrylate, ethyl acrylate, butyl acrylate, 2-ethylhexyl acrylate, etc.

In this case, from the viewpoint of adjusting the shear storage elastic modulus (G') measured at 100° C. and 1 Hz to $1.00 \times 10^7$ Pa or less, the copolymerization ratio of the acrylate to the total weight of the styrene-based resin (A) is preferably 1 wt % or more and more preferably 2 wt % or more. From the viewpoint of the heat resistance and strength of the styrene-based resin (A) and of maintaining its post-processing workability, the copolymerization ratio of the acrylate to the total weight of the styrene-based resin (A) is preferably less than 10 wt % and more preferably less than 8 wt %.

From the viewpoint of improving the color development of the three-dimensional modeling material finally obtained, the styrene-based resin (A) is preferable to further contain methyl methacrylate as another unsaturated carboxylic acid alkyl ester-based monomer.

From the viewpoint of the color development, the copolymerization ratio of the methyl methacrylate to the total weight of the styrene-based resin (A) is preferably 5 wt % or more and more preferably 10 wt % or more. From the viewpoint of the strength and shock resistance of the three-dimensional modeling material and the shaped object and of maintaining their post-processing workability, the copolymerization ratio of the methyl methacrylate to the total weight of the styrene-based resin (A) is preferably 60 wt % or less and more preferably 50 wt % or less.

Preferably, the styrene-based resin (A) contains a structural unit derived from a conjugated diene-based monomer. Examples of the conjugated diene-based monomer include 2-methyl-1,3-butadiene, 2,4-hexadiene, and 1,3-butadiene. Of these, from the viewpoint of shock resistance, 1,3-butadiene is preferred. One or two or more of them may be used.

From the viewpoint of the shock resistance of the styrene-based resin (A), the copolymerization ratio of the conjugated diene-based monomer to the total weight of the styrene-based resin (A) is preferably 1 wt % or more and more preferably 3 wt % or more. From the viewpoint of the heat resistance and strength of the styrene-based resin (A), the copolymerization ratio of the conjugated diene-based monomer to the total weight of the styrene-based resin (A) is preferably 30 wt % or less and more preferably 20 wt % or less.

Preferably, the styrene-based resin (A) contains a structural unit derived from a vinyl cyanide-based monomer. No particular limitation is imposed on the vinyl cyanide-based monomer, and specific examples thereof include acrylonitrile, methacrylonitrile, and ethacrylonitrile. Of these, acrylonitrile is used preferably. One or two or more of them may be used.

It is preferable to contain the vinyl cyanide-based monomer because, when a resin containing a vinyl cyanide-based monomer such as an ABS resin is used as the thermoplastic resin (B) of the multilayer structure of the three-dimensional modeling material in the present invention, the adhesion between the core and the sheath is improved.

From the viewpoint of the adhesion between the core and the sheath when a resin containing a vinyl cyanide-based monomer such as an ABS resin is used as the thermoplastic resin (B) described later, the copolymerization ratio of the vinyl cyanide-based monomer to the total weight of the styrene-based resin (A) is preferably 1 wt % or more and more preferably 5 wt % or more. From the viewpoint of the shock resistance of the styrene-based resin (A), the copolymerization ratio of the vinyl cyanide-based monomer to the total weight of the styrene-based resin (A) is preferably 95 wt % or less.

The styrene-based resin (A) is preferably a styrene-based resin containing structural units derived from any of the above-described monomers such as an MBS resin. However, the above-described G' can be achieved also by mixing any of styrene-based resins listed for the styrene-based resin (B) described later with a styrene-based resin that is compatible with the any of the styrene-based resins and has a very low weight average molecular weight of about 5000 or less. However, the addition of the resin with a very low molecular weight is not preferred because it is feared that a reduction in strength may occur.

Moreover, the styrene-based resin (A) may be prepared by adding, to any of the styrene-based resins listed for the styrene-based resin (B) described later, a low-Tg resin that is compatible with this styrene-based resin. Examples of the low-Tg resin include styrene-based resins and polybutylene succinate (PBS) resins. In particular, when an ABS resin or an AS resin is used as the styrene-based resin (B), it is preferable from the viewpoint of compatibility to use a PBS resin. However, this technique is not preferable in terms of productivity because the additional step of adding the low-Tg resin and kneading the mixture is required.

Preferably, the styrene-based resin (A) only has a glass transition temperature (Tg) in the range of lower than 100° C. The styrene-based resin (A) may have a plurality of Tg's. However, preferably, all the Tg's are in the range of lower than 100° C., and the styrene-based resin (A) has no Tg in the range of 100° C. or higher. As for the Tg's, at least one Tg is preferably 50° C. or higher, more preferably 60° C. or higher, still more preferably 70° C. or higher, and particularly preferably 75° C. or higher and is preferably 98° C. or lower, more preferably 95° C. or lower, and still more preferably 90° C. or lower. It is preferable that each Tg is equal to or lower than the above upper limit because the effect of preventing warpage during modeling using the three-dimensional modeling material is enhanced. When each Tg is equal to or lower than the upper limit, the difference between the modeling atmosphere temperature and the temperature at which the resin ejected from a nozzle of a three-dimensional printer solidifies during modeling is small, and therefore shrinkage stress due to linear expansion after solidified is small, so that warpage may be prevented. It is preferable that each Tg is equal to or higher than the above lower limit because the heat resistance of the shaped object using the three-dimensional modeling material of the first invention is improved.

The Tg of the styrene-based resin (A) can be controlled, for example, by copolymerizing any of the above-described monomers.

The melt index (MI) of the styrene-based resin (A) that is measured at 220° C. and 10 kg is preferably 10 or more and less than 100 and more preferably 20 or more and less than 90. As for the properties of the three-dimensional modeling material to be obtained, it is preferable that the MI is equal to or more than the above lower limit because the high-speed formability during three-dimensional modeling tends to be high. It is preferable that the MI is equal to or lower than the above upper limit because the molecular weight is not excessively low and therefore high strength tends to be obtained.

In the present description, the MI is measured using a melt index meter according to JIS K7210. Specifically, it is preferable to perform the measurement under the conditions described in Examples described later.

The unit of the MI is "g/10 min." However, in the present description, the unit is omitted.

The MI of the styrene-based resin (A) can be adjusted by changing the molecular weight of the resin. The weight average molecular weight (Mw) of the styrene-based resin (A) is as described above. A more appropriate molecular weight for achieving the above MI depends on the composition of the resin. For the resin having the above-described preferred composition, the Mw is preferably 50000 or more and less than 200000 and more preferably 100000 or more and less than 180000.

(Olefin-Based Resin)

The thermoplastic resin (A) used in the three-dimensional modeling material of the first invention may be a resin containing an olefin-based resin.

The olefin-based resin is a resin having at least a structural unit derived from an alkene and is preferably a resin having a structural unit derived from ethylene, α-olefin, or propylene. The olefin-based resin may optionally have a structural unit derived from maleic anhydride, an unsaturated carboxylic acid, or an acrylate monomer.

No particular limitation is imposed on the olefin-based resin used for the thermoplastic resin (A) (which hereinafter may be referred to as "olefin-based resin (A)"), and the olefin-based resin (A) can be obtained using a monomer such as propylene, ethylene, or α-olefin by a well-known polymerization method using a well-known olefin polymerization catalyst. Example of the polymerization method include a slurry polymerization method, a solution polymerization method, and a vapor phase polymerization method that use a multi-site catalyst typified by a Ziegler-Natta catalyst or a single-site catalyst typified by a metallocene catalyst or a post-metallocene catalyst and further include a bulk polymerization method that uses a radical initiator.

No limitation is imposed on the molecular weight of the olefin-based resin (A). The weight average molecular weight (Mw) of the olefin-based resin (A) is preferably 20,000 or more, more preferably 50,000 or more and is preferably 1,000,000 or less.

The weight average molecular weight as used herein is a polystyrene-equivalent weight average molecular weight measured by GPC using, for example, o-dichlorobenzene as a solvent.

Specific examples of the olefin-based resin (A) include very low density polyethylene resins, low density polyethylene resins, linear low density polyethylene (ethylene-α-olefin copolymer) resins, medium density polyethylene resins, high density polyethylene resins, propylene homopolymers, and copolymers of propylene and additional monomers copolymerizable with propylene. Examples of the additional monomers copolymerizable with propylene include: ethylene; α-olefins having 4 to 12 carbon atoms such as 1-butene, 1-hexene, 4-methyl-pentene-1, and 1-octene; and dienes such as divinylbenzene, 1,4-cyclohexadiene, dicyclopentadiene, cyclooctadiene, and ethylidenenorbornene. No particular limitation is imposed on the mode of copolymerization (random, block, etc.), branching, branching degree distribution, and stereo structure. The copolymers may be isotactic, atactic, or syndiotactic copolymers or may be polymers having a structure including a mixture thereof.

Preferably, a monomer for the olefin-based resin (A) is selected such that the shear storage elastic modulus (G') of the thermoplastic resin (A) that is measured at 100° C. and 1 Hz is $1.00 \times 10^7$ Pa or less, or the olefin-based resin (A) may be a mixture of a plurality of resins. In particular, from the viewpoint of formability, the olefin-based resin (A) is preferably a very low density polyethylene resin, a low density polyethylene resin, a linear low density polyethylene (ethylene-α-olefin copolymer) resin, a medium density polyethylene resin, or a copolymer of propylene and at least one monomer selected from ethylene and α-olefins having 4 to 12 carbon atoms such as 1-butene, 1-hexene, 4-methyl-pentene-1, and 1-octene. In consideration of the heat resistance of the three-dimensional modeling material, it is preferable to select a propylene-based resin as the thermoplastic resin (B) described later. Therefore, from the viewpoint of interfacial adhesion when the olefin-based resin (A) and the propylene-based resin are used to form a core-sheath structure, the olefin-based resin (A) is preferably a copolymer of propylene and at least one monomer selected from ethylene and α-olefins having 4 to 12 carbon atoms such as 1-butene, 1-hexene, 4-methyl-pentene-1, and 1-octene. Specific examples of the propylene-based resin include product names: WELNEX RMG02 and WELNEX RFG4VM manufactured by Japan Polypropylene Corporation.

The melt index (MI) of the olefin-based resin (A) at 190° C. and 10 kg is preferably 10 or more and less than 150 and more preferably 20 or more and less than 120. As for the properties of the three-dimensional modeling material to be obtained, it is preferable that the MI is equal to or more than the above lower limit because the high-speed formability during three-dimensional modeling tends to be high. It is preferable that the MI is equal to or lower than the above upper limit because the molecular weight is not excessively low and therefore high strength tends to be obtained.

The MI of the olefin-based resin (A) can be adjusted by changing the molecular weight of the resin.

No particular limitation is imposed on the melting point (Tm) of the olefin-based resin (A). However, in relation to the shear storage elastic modulus (G') measured at 100° C. and 1 Hz, the melting point (Tm) of the olefin-based resin (A) is preferably 170° C. or lower and more preferably 160° C. or lower. The melting point (Tm) of the olefin-based resin (A) is generally 80° C. or higher.

[Thermoplastic Resin (B)]

(Physical Properties)

In the thermoplastic resin (B) used in the three-dimensional modeling material of the first invention, the shear storage elastic modulus (G') measured at 100° C. and 1 Hz is more than $1.00 \times 10^7$ Pa. From the viewpoint of the heat resistance of the shaped object and the heat resistance during modeling, the G' of the thermoplastic resin (B) is preferably $2.00 \times 10^7$ Pa or more. Generally, the shear storage elastic modulus (G') of a resin cannot be measured after the resin has been cured. When the measurement cannot be performed, it can be judged that the shear storage elastic modulus (G') is much larger than $2.00 \times 10^7$ Pa. The G' of the thermoplastic resin (B) is generally much larger than $2.00 \times 10^7$ Pa.

No particular limitation is imposed on the composition of the thermoplastic resin (B) having the above-described shear storage elastic modulus (G'), as described later. For example, the thermoplastic resin (B) may be at least one selected from styrene-based resins, olefin-based resins, polylactic acid (PLA), and polyester-based resins. The above G' can be achieved by appropriately selecting the types of monomers forming these resins or adding a filler such as carbon fibers or glass fibers. In particular, it is preferable to select a styrene-based resin or an olefin-based resin as a main component because of their low hygroscopicity and high shock resistance. In this case, the main component is a component contained in an amount of 50 wt % or more in the thermoplastic resin (B).

From the viewpoint of the heat resistance of the shaped object and the heat resistance during modeling, the tensile storage elastic modulus (E') of the thermoplastic resin (B) that is measured at 100° C. and 10 Hz is preferably more than 100 MPa and more preferably 200 MPa or more. The E' of the thermoplastic resin (B) is generally 2000 MPa or less.

The tensile storage elastic modulus (E') measured at 100° C. and 10 Hz can be adjusted by changing the composition of the resin, copolymerization ratios, etc.

From the viewpoint of the room temperature strength of the three-dimensional modeling material and the shaped object to be obtained, the tensile storage elastic modulus (E') of the thermoplastic resin (B) that is measured at 30° C. and 10 Hz is preferably 400 Ma or more, more preferably 800 MPa or more, and still more preferably 1000 MPa or more. The upper limit of the E' of the thermoplastic resin (B) is generally about 5000 MPa or less.

The tensile storage elastic modulus (E') measured at 30° C. and 10 Hz can be adjusted by changing the composition of the resin, copolymerization ratios, etc.

(Styrene-Based Resin)

The thermoplastic resin (B) may be a resin containing a styrene-based resin.

The styrene-based resin may contain a structural unit derived from the same monomer as any of the above-described monomers for the styrene-based resin (A) used for the thermoplastic resin (A). Examples of the monomer include ABS resins, AS resins, MBS resins, MS resins, and polystyrene. Of these, ABS resins are preferred because of their excellent strength and shock resistance. From the viewpoint of adhesion strength between the thermoplastic resin (B) and the styrene-based resin (A) when a multilayer structure described later is formed, it is preferable to select an MBS resin.

In the styrene-based resin contained in the thermoplastic resin (B) (which hereinafter may be referred to as "styrene-based resin (B)"), it is preferable to select a monomer such that the shear storage elastic modulus (G') of the thermoplastic resin (B) that is measured at 100° C. and 1 Hz is larger than $1.00 \times 10^7$ Pa. Specific example of the ABS resin used as the styrene-based resin (B) include HF-3 and EX19C manufactured by Techno-UMG Co., Ltd. and GT-R-61A manufactured by Denka Company Limited.

Preferably, the styrene-based resin (B) has a glass transition temperature (Tg) of 100° C. or higher. The Tg of the styrene-based resin (B) is more preferably 101° C. or higher. It is only necessary that the styrene-based resin (B) have at least one Tg in the range of 100° C. or higher. When the styrene-based resin (B) has a plurality of Tg's, the resin may have a Tg of lower than 100° C.

When the styrene-based resin (B) has a Tg equal to or higher than the above lower limit, the heat resistance of the shaped object of the three-dimensional modeling material to be obtained and the heat resistance during modeling are improved.

The melt index (MI) of the styrene-based resin (B) at 220° C. and 10 kg is preferably 10 or more and less than 100 and more preferably 20 or more and less than 90. As for the properties of the three-dimensional modeling material to be obtained, it is preferable that the MI of the styrene-based resin (B) is equal to or more than the above lower limit because the high-speed formability during three-dimensional modeling tends to be high. It is preferable that the MI of the styrene-based resin (B) is equal to or lower than the above upper limit because the molecular weight is not excessively low and therefore high strength tends to be obtained.

The MI of the styrene-based resin (B) can be adjusted by changing the molecular weight of the resin. An appropriate molecular weight of the styrene-based resin (B) depends on the composition of the resin. When the resin has a preferred composition, the weight average molecular weight (Mw) is preferably 50000 or more and less than 200000 and more preferably 100000 or more and less than 180000.

From the viewpoint of the heat resistance of the shaped object and the heat resistance during modeling, the tensile storage elastic modulus (E') of the styrene-based resin (B) that is measured at 100° C. and 10 Hz is preferably 100 MPa or more, more preferably 500 MPa or more, and still more preferably 800 MPa or more. The E' is generally about 5000 MPa or less.

The tensile storage elastic modulus (E') measured at 100° C. and 10 Hz can be adjusted by changing the composition of the resin, copolymerization ratios, etc.

From the viewpoint of the room temperature strength of the three-dimensional modeling material and the shaped object to be obtained, the tensile storage elastic modulus (E') of the styrene-based resin (B) that is measured at 30° C. and 10 Hz is preferably 400 Ma or more, more preferably 800 MPa or more, and still more preferably 1000 MPa or more. The E' is generally about 5000 MPa or less.

The tensile storage elastic modulus (E') measured at 30° C. and 10 Hz can be adjusted by changing the composition of the resin, copolymerization ratios, etc.

(Olefin-Based Resin)

The thermoplastic resin (B) used in the three-dimensional modeling material of the first invention may be a resin containing an olefin-based resin.

The olefin-based resin used for the thermoplastic resin (B) (which hereinafter may be referred to as "olefin-based resin (B)") may contain a structural unit derived from the same monomer as any of the above-described monomers for the olefin-based resin (A) used for the thermoplastic resin (A). Examples of the monomer include very low density polyethylene resins, low density polyethylene resins, linear low density polyethylene (ethylene-α-olefin copolymer) resins, medium density polyethylene resins, high density polyethylene resins, propylene homopolymers, and copolymers of propylene and additional monomers copolymerizable with propylene. Examples of the additional monomers copolymerizable with propylene include: ethylene; α-olefins having 4 to 12 carbon atoms such as 1-butene, 1-hexene, 4-methyl-pentene-1, and 1-octene; and dienes such as divinylbenzene, 1,4-cyclohexadiene, dicyclopentadiene, cyclooctadiene, and ethylidenenorbornene. No particular limitation is imposed on the mode of copolymerization (random, block, etc.), branching, branching degree distribution, and stereo structure. The copolymers may be isotactic, atactic, or syndiotactic copolymers or may be polymers having a structure including a mixture thereof.

Preferably, a monomer for the olefin-based resin (B) is selected such that the shear storage elastic modulus (G') of the thermoplastic resin (B) that is measured at 100° C. and 1 Hz is more than $1.00 \times 10^7$ Pa, or the olefin-based resin (B) may be a mixture of a plurality of resins. In particular, from the viewpoint of formability, the olefin-based resin (B) is preferably a linear low density polyethylene (ethylene-α-olefin copolymer) resin, a medium density polyethylene resin, a high density polyethylene resin, a propylene homopolymer, or a copolymer of propylene and at least one monomer selected from ethylene and α-olefins having 4 to 12 carbon atoms such as 1-butene, 1-hexene, 4-methyl-pentene-1, and 1-octene. In particular, in consideration of the heat resistance of the three-dimensional modeling material, the content of the propylene monomer in the olefin-based resin (B) is preferably 30 wt % or more and more preferably 50 wt % or more. A nucleating agent such as talc may be added to increase crystallinity. Specific examples of the propylene-based resin (B) include product names: NOVATEC PP MA3 and WINTEC WMG03 manufactured by Japan Polypropylene Corporation.

No particular limitation is imposed on the molecular weight of the olefin-based resin (B), but the weight average molecular weight (Mw) is preferably 20,000 or more and more preferably 50,000 or more and is preferably 1,000,000 or less.

The melt index (MI) of the olefin-based resin (B) at 190° C. and 10 kg is preferably 10 or more and less than 150 and more preferably 20 or more and less than 120. As for the properties of the three-dimensional modeling material to be obtained, it is preferable that the MI of the olefin-based resin (B) is equal to or more than the above lower limit because the high-speed formability during three-dimensional modeling tends to be high. It is preferable that the MI of the olefin-based resin (B) is equal to or lower than the above upper limit because the molecular weight is not excessively low and therefore high strength tends to be obtained.

The MI of the olefin-based resin (B) can be adjusted by changing the molecular weight of the resin.

No particular limitation is imposed on the melting point (Tm) of the olefin-based resin (B). In relation to the above-described G', the melting point (Tm) of the olefin-based resin (B) is preferably 110° C. or higher and more preferably 130° C. or higher and is generally 180° C. or lower.

[Structure of Three-Dimensional Modeling Material]

The three-dimensional modeling material of the first invention has a multilayer structure including the thermoplastic resin (A) and the thermoplastic resin (B) in respective different layers. Such a specific multilayer structure can improve heat resistance while warpage during modeling is prevented.

Even a single layer filament prepared by mixing the thermoplastic resin (A) and the thermoplastic resin (B) can improve the heat resistance while warpage during modeling is prevented. However, to prevent the warpage, it is necessary to increase the content of the thermoplastic resin (A), so that the improvement in the heat resistance is limited. Moreover, since an additional production step for mixing is necessary, the production cost increases.

In the multilayer structure including the thermoplastic resin (A) and the thermoplastic resin (B) in their respective different layers, the warpage is prevented even when the thickness of the thermoplastic resin (A) layer is reduced to some extent. Therefore, the content of the thermoplastic resin (B) can be increased, so that high heat resistance can be imparted to the three-dimensional modeling material while the warpage is prevented. Moreover, since it is unnecessary to mix the thermoplastic resin (A) and the thermoplastic resin (B), the production cost can be reduced.

No particular limitation is imposed on the form of the three-dimensional modeling material of the first invention so long as it is applicable to a fused deposition modeling three-dimensional printer. Examples of the form include powders, pellets, granules, and filaments.

No particular limitation is imposed on the multilayer structure in the present invention. Specific examples of the multilayer structure of the three-dimensional modeling material of the present invention will be described using FIG. 1.

FIG. 1 shows cross-sectional views of three-dimensional modeling materials. For example, in the case of three-dimensional modeling filaments, cross sections obtained by cutting the filaments at given points perpendicularly to their longitudinal axis are observed. Examples of the multilayer structure include a pattern in which two or more resins are formed into a core-sheath structure as shown in FIG. 1(a) and a pattern in which two or more resins are stacked such that a cross section of the filament has a layered structure as shown in FIG. 1(b).

No particular limitation is imposed on the placement positions of the resins in the multilayer structure. It is preferable that at least part of the surface of the three-dimensional modeling material is a layer containing the thermoplastic resin (A) because the shaped object can have high interlayer adhesion (high Z-axis strength). It is more preferable that the outermost layer contains the thermoplastic resin (A). Specifically, it is preferable that, in FIGS. 1(a) and 1(b), portions denoted by symbol 1 that occupy most of the surface are the thermoplastic resin (A) and portions denoted by symbol 2 are the thermoplastic resin (B).

From the viewpoint of interlayer adhesion in the multilayer structure of the three-dimensional modeling material, it is preferable that the thermoplastic resin (A) and the thermoplastic resin (B) in the multilayer structure of the first invention are resins having the same structural unit. For example, it is preferable that both the thermoplastic resins (A) and (B) are styrene-based resins or olefin-based resins.

As for the ratios of the thermoplastic resin (A) and the thermoplastic resin (B) in the three-dimensional modeling material of the first invention, the volume ratio of the thermoplastic resin (B) to the total volume of the thermoplastic resin (A) and the thermoplastic resin (B) is preferably 40% or more, more preferably 50% or more, and still more preferably 60% or more, from the viewpoint of the heat resistance of the shaped object and the heat resistance during modeling. From the viewpoint of the Z-axis strength of the shaped object and the three-dimensional modeling material productivity, the upper limit of the volume ratio of the thermoplastic resin (B) to the total volume of the thermoplastic resin (A) and the thermoplastic resin (B) is preferably 99% or less, more preferably 98% or less, and still more preferably 95% or less.

[Physical properties of three-dimensional modeling material]

When styrene-based resins are used for the thermoplastic resin (A) and the thermoplastic resin (B), the melt index (MI) of the three-dimensional modeling material of the first invention that is measured at 220° C. and 10 kg is preferably 10 or more and 100 or less. The MI is more preferably 20 or more and still more preferably 30 or more and is more preferably 90 or less and still more preferably 80 or less.

When olefin-based resins are used for the thermoplastic resin (A) and the thermoplastic resin (B), the melt index (MI) of the three-dimensional modeling material of the first invention that is measured at 190° C. and 10 kg is preferably 10 or more and 150 or less. The MI is more preferably 20 or more and 120 or less.

It is preferable that the MI of the three-dimensional modeling material of the first invention is equal to or more than the above lower limit because the high-speed formability during three-dimensional modeling tends to be high. It is preferable that the MI of the three-dimensional modeling material of the first invention is equal to or lower than the above upper limit because the molecular weight is not excessively low and therefore high strength tends to be obtained.

In the three-dimensional modeling material of the first invention, the tensile storage elastic modulus (E') measured at 100° C. and 10 Hz is preferably 1000 MPa or less and more preferably 900 MPa or less, from the viewpoint of preventing warpage during modeling. From the viewpoint of the heat resistance of the shaped object and the heat resistance during modeling, the E' is preferably 100 MPa or more. If the heat resistance of the shaped object is low, it is feared that the shaped object may deform at high temperature. If the heat resistance during modeling is low, it is feared that the shaped object may deform during modeling and a modeling fault may occur.

In the three-dimensional modeling material of the first invention, the tensile storage elastic modulus (E') measured at 30° C. and 10 Hz is preferably 400 MPa or more, more preferably 500 MPa or more, and still more preferably 800 MPa or more, from the viewpoint of the room temperature strength of the filament and the shaped object. The E' is generally about 5000 MPa or less.

In the three-dimensional modeling material of the first invention, the shear storage elastic modulus (G') measured at 100° C. and 1 Hz is preferably $0.05 \times 10^7$ Pa or more and more preferably $0.1 \times 10^7$ Pa or more, from the viewpoint of heat resistance during modeling. If the heat resistance during modeling is low, it is feared that the shaped object may deform during modeling and a modeling fault may occur. The upper limit of the G' is not particularly specified, and the G' is generally less than $10 \times 10^7$ Pa. The above G' can be achieved using the thermoplastic resin (A) and the thermoplastic resin (B) in combination.

[Additional Components]

In addition to the thermoplastic resin (A) and the thermoplastic resin (B), additional components may be added to the three-dimensional modeling material of the first invention so long as the effects of the first invention are not impaired. The following components may be used in any combination.

(Rubber Particles)

Rubber particles may be used for the purpose of improving the heat resistance of the three-dimensional modeling material during modeling and its shock resistance.

Examples of the rubber particles include acrylic-based rubber particles, butadiene-based rubber particles, silicon-based rubber particles, and olefin-based rubber particles. In particular, for the purpose of improving the shock resistance of the styrene-based resin and improving its heat resistance during modeling, butadiene-based rubber particles are preferred, from the viewpoint of dispersibility in the styrene-based resin. Examples of the butadiene-based rubber particles include METABLEN C-223A manufactured by Mitsubishi Chemical Corporation.

(Filler)

For the purpose of improving the stiffness of the three-dimensional modeling material and the stiffness of the filament, it is preferable to use an organic filler or an inorganic filler.

Examples of the organic filler include cellulose fibers, aramid fibers, polyester fibers, and polyamide fibers.

Examples of the inorganic filler include carbon fibers, glass fibers, mica, talc, silica, and alumina. Of these, carbon fibers, glass fibers, mica, and talk are preferable in terms of stiffness.

Moreover, for the purpose of imparting specific characteristics to the three-dimensional modeling material, additives such as a flame retardant, an antioxidant, an ultraviolet absorber, and an antifogging agent may be added.

An additional resin may be added so long as the effects of the first invention are not impaired.

[Three-Dimensional Modeling Filament]

The three-dimensional modeling filament of the first invention is produced using the above-described three-dimensional modeling material of the first invention. No particular limitation is imposed on the method for producing the three-dimensional modeling filament of the first invention. Generally, the three-dimensional modeling filament can be obtained using, for example, a method in which the three-dimensional modeling material of the present invention is molded using a well-known molding method such as extrusion molding or a method in which the filament is directly formed during the production of the three-dimensional modeling material. For example, when the three-dimensional modeling filament of the first invention is obtained by extrusion molding, a production condition of generally 150 to 260° C. and preferably 170 to 250° C. is used.

The diameter of the three-dimensional modeling filament of the first invention depends on the performance of a system used and is preferably 1.0 to 5.0 mm and more preferably 1.3 to 3.5 mm. From the viewpoint of stable raw material supply, it is preferable that the accuracy of the diameter measured at a given measurement point falls within an error of +5%.

In the three-dimensional modeling filament in the first invention, the multilayer structure is preferably a core-sheath structure shown in FIG. 1(a). In this case, from the viewpoint of the heat resistance of the shaped object and the heat resistance during modeling, the core portion is preferably 10% or more, particularly preferably 50% or more, and most preferably 60% or more of the diameter of the filament. From the viewpoint of the Z-axis strength of the shaped object and the three-dimensional modeling material productivity, the core portion is preferably 99% or less, particularly preferably 98% or less, and most preferably 95% or less of the diameter of the filament.

In the core-sheath structure, it is preferable that the core portion is a layer containing the thermoplastic resin (B) and the sheath portion is a layer containing the thermoplastic resin (A).

When the three-dimensional modeling filament of the first invention is used to produce a shaped article using a fused deposition modeling three-dimensional printer, it is required that the three-dimensional modeling filament be stably stored and stably supplied to the fused deposition modeling three-dimensional printer.

Therefore, from the viewpoint of long-term storage, stable feeding, protection from environment factors such as humidity, prevention of twisting, etc., it is preferable that the three-dimensional modeling filament of the first invention is wound around a bobbin and the filament roll is hermetically packaged or housed in a cartridge.

Examples of the cartridge include a cartridge having a structure in which, in addition to the roll wound around the bobbin, a dampproof material or a hygroscopic material is used inside the structure and which is sealed except for at least an orifice for feeding the filament.

The water content of the three-dimensional modeling filament is preferably 3,000 ppm or less and more preferably 2,500 ppm or less.

It is preferable that the product of the three-dimensional modeling filament is sealed such that the water content of the filament is 3,000 ppm or less and more preferably 2,500 ppm or less.

To prevent blocking of the three-dimensional modeling filament when the filament is wound into a roll, a blocking agent may be applied to the surface of the filament, or the surface of the filament may be coated with the blocking agent.

Examples of the blocking agent that can be used include silicone-based blocking agents, inorganic fillers such as talc, and aliphatic acid metal salts. Only one of these blocking agents may be used, or a combination of two or more may be used.

Preferred forms of the filament are a roll wound around, for example, a bobbin and a three-dimensional printer cartridge including the filament housed in a container. In particular, the cartridge including the roll of the filament housed in the container is generally placed inside or near a three-dimensional printer, and the filament is continuously introduced from the cartridge into the three-dimensional printer during molding.

[Shaped Article Producing Method]

By molding the three-dimensional modeling material or the three-dimensional modeling filament of the first invention using a fused deposition modeling three-dimensional printer, a shaped article can be produced.

Generally, the fused deposition modeling three-dimensional printer includes a heatable substrate (modeling table), an extrusion head (nozzle), a heat-fusing unit, and a raw material feeding unit including a filament guide, a filament placement portion, etc. In some material extrusion three-dimensional printers, the extrusion head is integrated with the heat-fusing unit.

The extrusion head is disposed on a gantry structure and can be moved freely in the X-Y plane on the substrate. The substrate is a platform for building a target three-dimensional object, a supporting material, etc. and is preferably configured such that, by heating a stacked object and keeping the temperature, the adhesion to the stacked object can be obtained and that a shaped article to be obtained is formed into a desired three-dimensional object with improved dimensional stability. Generally, at least one of the extrusion head and the substrate is movable in the Z-axis direction perpendicular to the X-Y plane.

The raw material is fed from the raw material feeding unit, introduced into the extrusion head using a pair of facing rollers or gears, heat-fused in the extrusion head, and extruded from the forward end of the nozzle. The extrusion head supplies the raw material onto the substrate while moving and changing its position according to a signal sent based on a CAD model to thereby deposit the raw material layer-by-layer. After completion of this process, the deposited stack is removed from the substrate and optionally separated from the supporting material etc., and unnecessary portions are trimmed. A shaped article can thereby be obtained as a desired three-dimensional object.

Examples of the means for continuously supplying the raw material to the extrusion head include a method in which a filament or a fiber is fed and supplied, a method in which a powder, granules, pellets, etc. are supplied from, for example, a tank through a volumetric feeder, and a method in which a powder, pellets, or granules are plasticized using, for example, an extruder and the plasticized material is extruded and supplied. Of these, the method in which a filament, i.e., the above-described three-dimensional modeling filament of the present invention, is fed and supplied is most preferable from the viewpoint of the simplicity of the process and supply stability.

When the raw material supplied is in the form of a filament, it is preferable from the viewpoint of stable feeding, protection from environmental factors such as humidity, prevention from twisting and kinking, etc. that the raw material wound around a bobbin is housed in a cartridge as described above.

When the raw material supplied is in the form of a filament, the filament is generally engaged with driving rolls such as nip rolls or gear rolls and supplied to the extrusion head while being drawn out. To stabilize the supply of the raw material by enhancing gripping of the filament due to engagement between the filament and the driving rolls, it is also preferable to transfer fine irregular shapes onto the filament surface in advance or add an inorganic additive, a spreading agent, an adhesive, rubber, etc. in order to increase the frictional resistance between the filament and the engagement portion.

In the three-dimensional modeling material of the first invention that is used for the three-dimensional modeling filament of the first invention, the temperature at which flowability suitable for extrusion is obtained is about 180 to about 250° C., which is wider than the applicable temperature range of conventional raw materials used for three-dimensional printers. Therefore, the shaped article can be produced stably by setting the temperature of the thermal extrusion head to preferably 200 to 240° C. and setting the substrate temperature to generally 110° C. or lower, preferably 60 to 80° C.

The temperature of the molten resin ejected from the extrusion head is preferably 180° C. or higher and more preferably 190° C. or higher and is preferably 250° C. or lower and more preferably 240° C. or lower.

It is preferable that the temperature of the molten resin is equal to or higher than the above lower limit because the resin can flow sufficiently and therefore the appearance of the shaped object tends to be good even when high-speed modeling is performed. It is preferable that the temperature of the molten resin is equal to or lower than the above upper limit because problems such as thermal decomposition or burning of the resin, smoking, odor emission, sticking, and the occurrence of lumps can be easily prevented.

The molten resin ejected from the extrusion head is ejected in the form of a strand having a diameter of preferably 0.01 to 1 mm and more preferably 0.02 to 0.8 mm. It is preferable to eject the molten resin in the above form because the reproducibility of the shaped object tends to be good.

The three-dimensional modeling material of the first invention is used for a fused deposition modeling three-dimensional printer. However, even when the three-dimensional modeling material is used for a powder bed fusion three-dimensional printer, it can also be expected to obtain the effect of preventing warpage during modeling.

A shaped article produced by the three-dimensional modeling method of the first invention is excellent in appearance, strength, heat resistance, post-processing workability, etc. Therefore, the shaped article can be preferably used for applications such as: stationery; toys; covers for mobile phones, smartphones, etc.; components such as grips; educational materials; repair parts for consumer electrical appliances and OA devices; various parts for automobiles, motorcycles, bicycles, etc.; members such as building materials; and forming dies for plastics.

Embodiments of Second Invention

[Three-Dimensional Printer]

The three-dimensional printer of the second invention is a material extrusion type three-dimensional printer including at least one nozzle and is characterized in that the at least one nozzle has a mechanism for stacking a plurality of molten resins and ejecting the stacked molten resins.

With the nozzle having the above mechanism, a prescribed multilayer structure can be formed by separately supplying the plurality of resins to one nozzle and stacking the molten resins inside the nozzle.

In the three-dimensional printer of the second invention, it is preferable that the at least one nozzle has a mechanism for stacking the plurality of molten resins to form a molten resin composite having a multilayer structure in a cross section orthogonal to a flow direction and then ejecting the molten resin composite.

Figure 3:
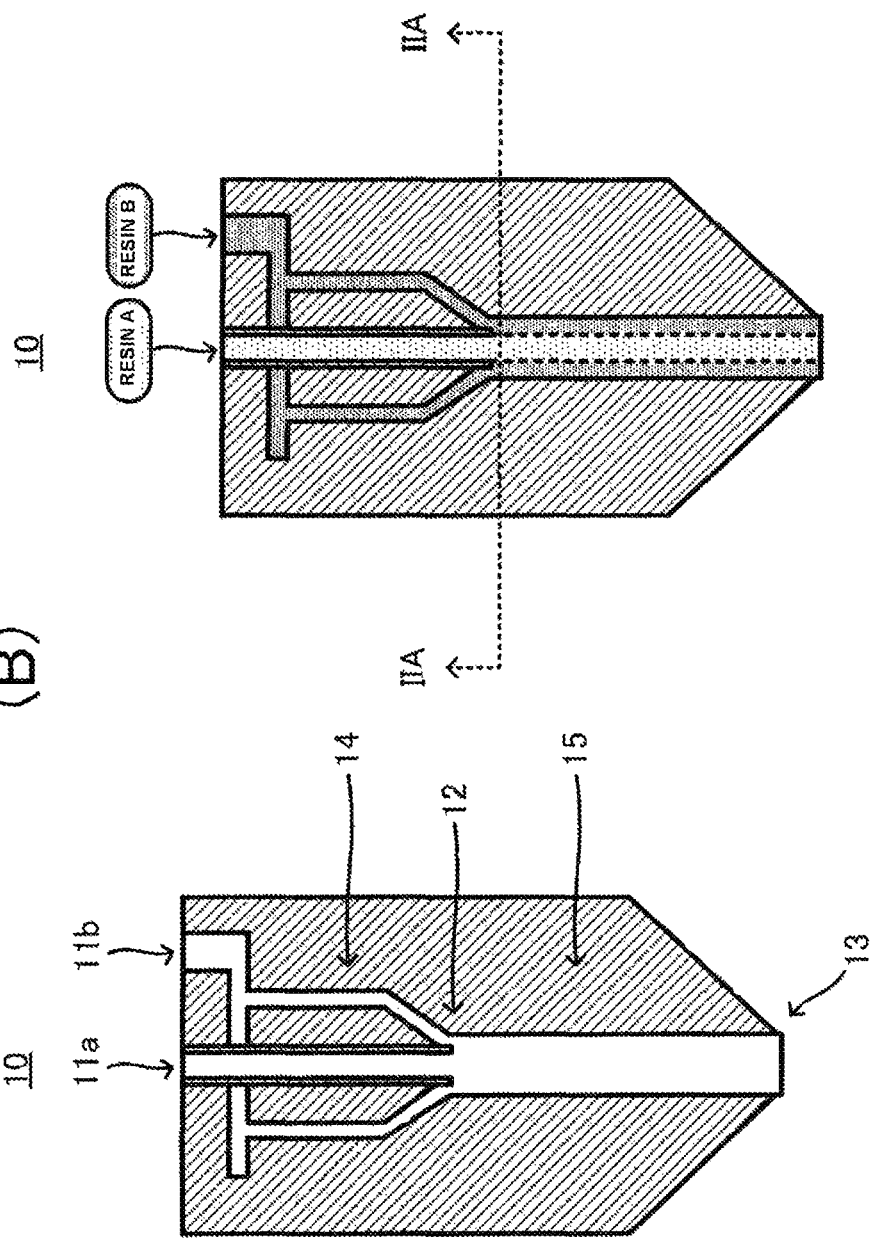
FIG. 3 shows schematic diagrams illustrating an example of the internal structure of a nozzle of the three-dimensional printer of the second invention.
Figure 5:
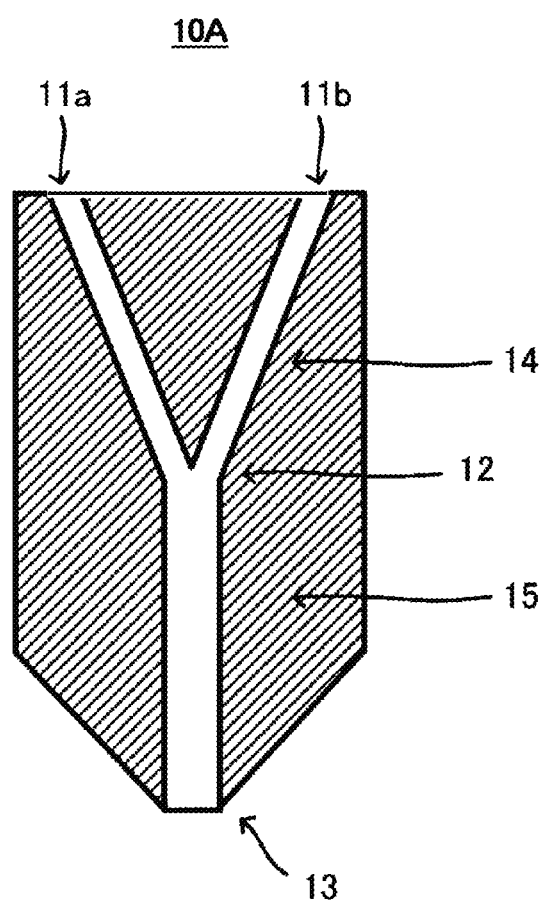
FIG. 5 is a schematic diagram showing another example of the internal structure of the nozzle of the three-dimensional printer of the second invention.
Figure 6:
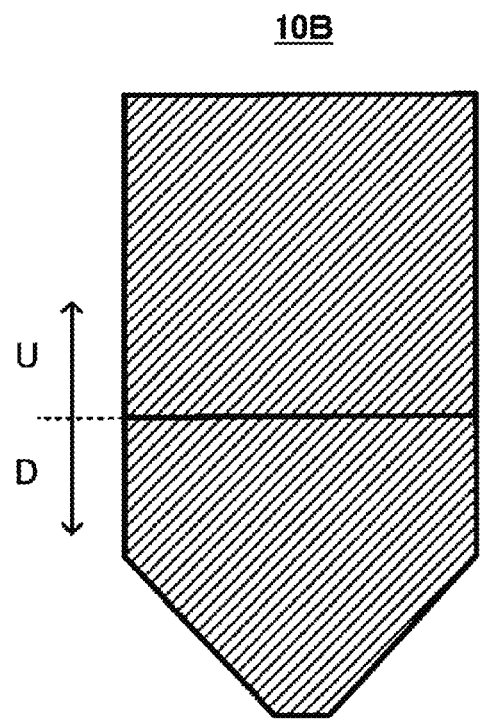
FIG. 6 is a schematic diagram showing a connection structure of the nozzle of the three-dimensional printer of the second invention.

FIGS. 3, 5, and 6 schematically show nozzles 10, 10A, and 10B as examples of the nozzle having the above mechanism.

FIG. 3(A) shows a state in which no resins are introduced, and FIG. 3(B) shows a state in which a resin a has been introduced from an inlet 11a and a resin b has been introduced from an inlet lib.

FIG. 4 schematically shows examples of the cross-sectional structure (the multilayer structure in a direction orthogonal to the flow direction) of the plurality of resins stacked inside the nozzle 10.

The cross-sectional shapes in FIG. 4 correspond to a cross-sectional view of the resin a and the resin b in a cross section viewed along arrows IIA-IIA in FIG. 3(B).

As shown in FIG. 3, the nozzle 10 includes the plurality of inlets 11a and 11b for introducing the molten resins, a merging portion 12 for merging the plurality of molten resins introduced from the plurality of inlets 11a and 11b to form a molten resin composite having a multilayer structure in a cross section orthogonal to the flow direction, and an ejection port 13 for ejecting the molten resin composite obtained through the merging portion 12.

As shown in FIG. 3, the nozzle 10 has the plurality of inlets 11a and 11b. This allows the plurality of resins to be supplied separately to the interior of the nozzle 10. The number of inlets is not limited to 2 as illustrated and may be 3 or more. The number of inlets may be appropriately adjusted according to the number of resins to be stacked or the cross-sectional shape of the molten resin composite.

As shown in FIG. 3, the resins separately introduced from the plurality of inlets 11a and 11b pass through passages 14 provided inside the nozzle 10 and reach the merging portion 12. No particular limitation is imposed on the lengths and diameters of the passages 14, and the lengths and diameters may be appropriately determined according to the forms of the supplied resins, their supply amounts, the flow characteristics, the cross-sectional shape of the molten resin composite, the diameter of the passage of the merging portion, etc.

The plurality of resins that have reached the merging portion 12 are stacked together and integrated to form the molten resin composite. The cross-sectional shape of the molten resin composite in the merging portion 12 varies depending on the shape of the merging portion 12 and the shapes of the passages 14 extending to the merging portion 12. The cross-sectional shape of the molten resin composite in the merging portion 12 also varies depending on the supply amounts of the resins introduced from the inlets 11a and 11b, the flow characteristics of the resins, etc.

A plurality of merging portions 12 may be provided. When two or more merging portions are present, it is only necessary that the molten resin composite have a desired cross-sectional shape in a merging portion 12 closest to the ejection port 13.

With the nozzle 10 shown in FIG. 3, a molten resin composite having a core-sheath structure shown in FIG. 4(A) can be obtained.

The cross-sectional shape of the molten resin composite is not limited to the above shape, and the molten resin composite may have shapes shown in FIGS. 4(B) to (D) or may have other shapes.

When the nozzle 10A shown in FIG. 5 is used to stack the resin a and the resin b in the merging portion 12, a molten resin composite having a cross-sectional shape in which the resin a and the resin b extending in the longitudinal direction are stacked inside the nozzle 10A can be formed as shown in FIG. 4(C).

The molten resin composite formed in the merging portion 12 passes through a passage 15 while the cross-sectional shape is maintained, reaches the ejection port 13, and is ejected from the ejection port 13. It is unnecessary that the diameter of the passage 15 be uniform. No particular limitation is imposed on the length of the passage 15. It is also possible to eject the molten resin composite from the ejection port 13 without passing through the passage 15. From the viewpoint of stabilizing the flow of the molten resin composite, improving the interfacial adhesion between the molten resins, etc., it is preferable that the nozzle 10 has the passage 15 between the merging portion 12 and the ejection port 13.

In the mode shown in FIG. 3, the entire nozzle 10 is formed from a single continuous member but may be formed from a plurality of members connected together. For example, as shown in FIG. 6, a nozzle 10B is formed by separately molding an upstream portion U of the nozzle and a downstream portion D of the nozzle that are separated at a boundary near the merging portion 12 and connecting them using a connection member such as a bolt or fitting them using a fitting structure that utilizes recesses and protrusions. In this case, the member forming the upstream portion U of the nozzle 10B and the member forming the downstream portion D may be detachable from each other. When the member forming the upstream portion U of the nozzle 10B and the member forming the downstream portion D are detachable from each other, the cross-sectional shape of the molten resin composite (see FIG. 4) can be easily changed by changing the member forming the upstream portion U.

Preferably, the nozzles 10, 10A, and 10B each have a heating mechanism such as a heater in order to maintain the fused state of the resins. The heating mechanism used can be a well-known conventional heating mechanism having a general structure.

In contrast to conventional nozzles, in the nozzles 10, 10A, and 10B in the second invention (which are collectively referred to as the "nozzle 10"), the plurality of resins are supplied separately through the plurality of inlets and stacked inside the nozzle 10. Therefore, even when the supply of the resins to the nozzle 10 is stopped (or the rotation of feed gears or screws described later is reversed to cause the materials to flow backward), liquid dripping from the forward end of the nozzle 10 may be likely to occur. Therefore, in order to prevent liquid dripping etc. during standby, it is preferable that the nozzle 10 has an appropriate closing mechanism that can physically close the ejection port 13. Alternatively, it is preferable that the nozzle 10 has a pressure controlling mechanism for controlling the pressure inside the nozzle 10. Mechanisms having well-known commonly used structures can be used as the closing mechanism and the pressure controlling mechanism.

No particular limitation is imposed on the size of the nozzle 10, and the size may be appropriately selected according to the size of the three-dimensional printer (the size of the shaped object to be produced).

In the three-dimensional printer of the second invention, no particular limitation is imposed on the structures of components other than the nozzle 10. It is only necessary that the three-dimensional printer of the second invention include structures essential to a fused deposition modeling three-dimensional printer. However, in the three-dimensional printer of the second invention, it is necessary to supply a plurality of resins to the nozzle 10. Therefore, a plurality of source of the resins used as modeling materials are connected to the nozzle 10. In the three-dimensional printer of the second invention, conventional structures may be applied to the structures other than the nozzle 10 according to the form of the modeling materials (filaments, pellets, powders, etc.).

Examples will be described below.

Figure 7:
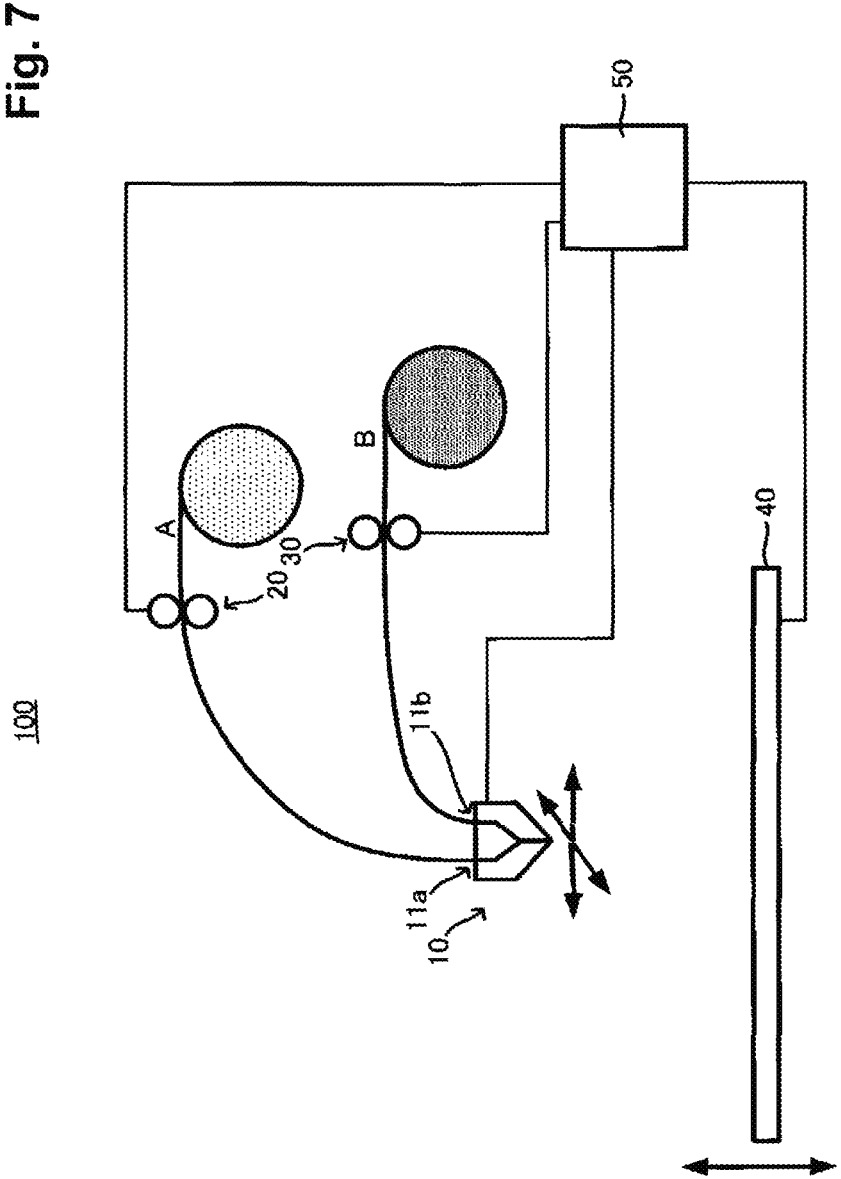
FIG. 7 is a schematic diagram showing an example of the structure of the three-dimensional printer of the second invention that uses filaments as modeling materials.

FIG. 7 shows an example of the structure of a three-dimensional printer that uses filaments as the modeling materials.

The three-dimensional printer 100 shown in FIG. 7 includes the nozzle 10 described above, feed gears 20 and 30 for continuously supplying the filaments to the nozzle 10, a modeling table 40, and a controller 50 that controls the operations of the above components.

As shown in FIG. 7, in the three-dimensional printer 100, filaments A and B are unwound through the feed gears 20 and 30 and separately fed to the inlets 11*a* and 11*b* of the nozzle 10. When the feed gears 20 and 30 are located away from the nozzle 10, it is preferable that tubes, for example, are disposed between the feed gears 20 and 30 and the inlets of the nozzle 10 to guide the filaments.

The controller 50 controls the numbers of revolutions of the feed gears 20 and 30. The amounts of the filaments A and B supplied to the nozzle 10 can thereby be controlled, and the plurality of resins can be stacked at a prescribed ratio inside the nozzle 10.

The controller 50 controls the temperature of the nozzle 10, its position in the XY directions, and the Z-axis height of the modeling table. A well-known commonly used structure may be used as the structure of the controller 50. By operating the components in the manner described above, three-dimensional modeling can be performed.

In the three-dimensional printer 100 shown in FIG. 7, the filaments can be supplied directly to the nozzle 10 using the feed gears 20 and 30. However, in this case, it is necessary that the filaments be appropriately fused in portions between the inlets of the nozzle 10 and the merging portion 12 by controlling a heating mechanism such as a heater.

Cylinders may be provided upstream of the nozzle 10, and the resins may be heated in the cylinders in advance and then supplied to the nozzle 10.

Figure 8:
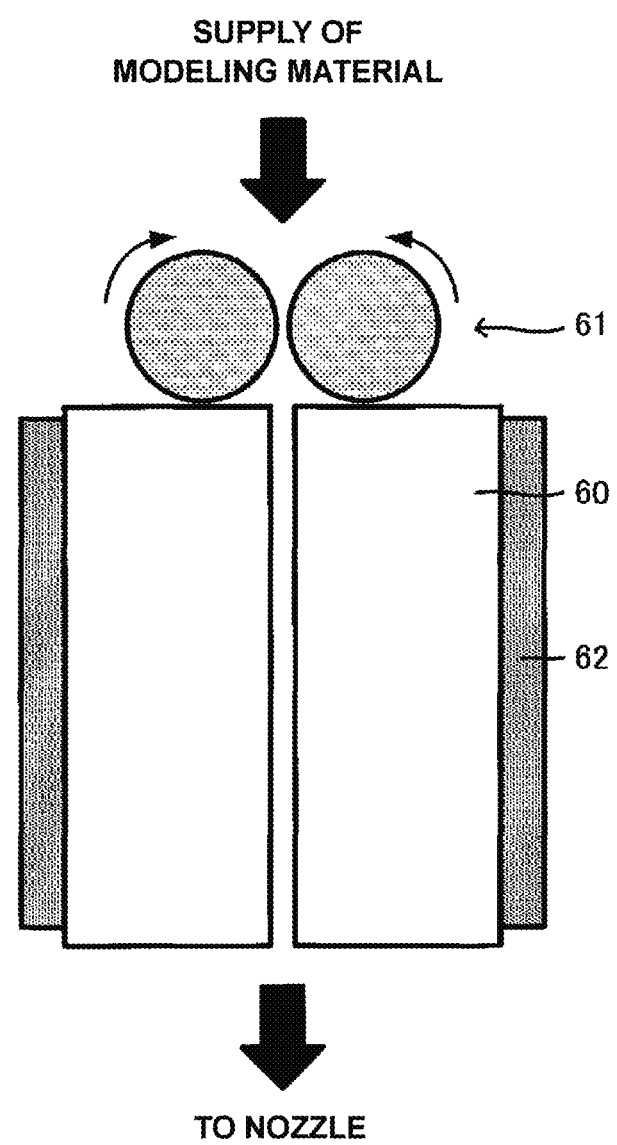
FIG. 8 is a schematic diagram showing an example of the structure of a cylinder etc. included in the three-dimensional printer 100.

FIG. 8 schematically shows an example of the structure of the cylinders that can be provided in the three-dimensional printer 100.

The cylinder 60 shown in FIG. 8 includes feed gears 61 disposed upstream thereof. The feed gears 61 may be disposed immediately upstream of the cylinder 60 or spaced apart therefrom. The feed gears 20 or 30 may serve as the feed gears 61. When the feed gears 61 are located away from the cylinder 60, it is preferable that a tube, for example, is disposed between the feed gears 61 and an inlet of the cylinder 60 to guide the filament.

The amount of the resin supplied from the cylinder 60 can be controlled by changing the amount of the filament supplied, i.e., the number of revolutions of the feed gears 61 etc. The filament supplied inside the cylinder 60 is heated by a heater 62 disposed outside the cylinder 60, and a molten resin is thereby formed. The molten resin is supplied from the outlet of the cylinder 60 to an inlet of the nozzle 10. The outlet of the cylinder 60 may be connected to the inlet of the nozzle 10 directly or through, for example, a pipe.

The three-dimensional printer of the second invention is also applicable to three-dimensional printing using modeling materials other than filaments.

Examples of the modeling material other than the filaments include resin pellets and resin powders. When pellets or powders are used as the modeling materials, the cost and time required to form filaments can be saved. Moreover, thermal history of the materials is less severe than that when filaments are used, and deterioration of the resins can be reduced.

The amount (length) of a filament that can be supplied is limited to a given amount because the filament is housed in, for example, a cartridge. However, as for a material such as pellets or a powder, the material can be easily replenished, and therefore there is no need to worry about running out of the material even when a large three-dimensional shaped object is produced.

Among the modeling materials other than the filament, pellets are preferred. The pellets can be handled more easily than powders.

Figure 9:
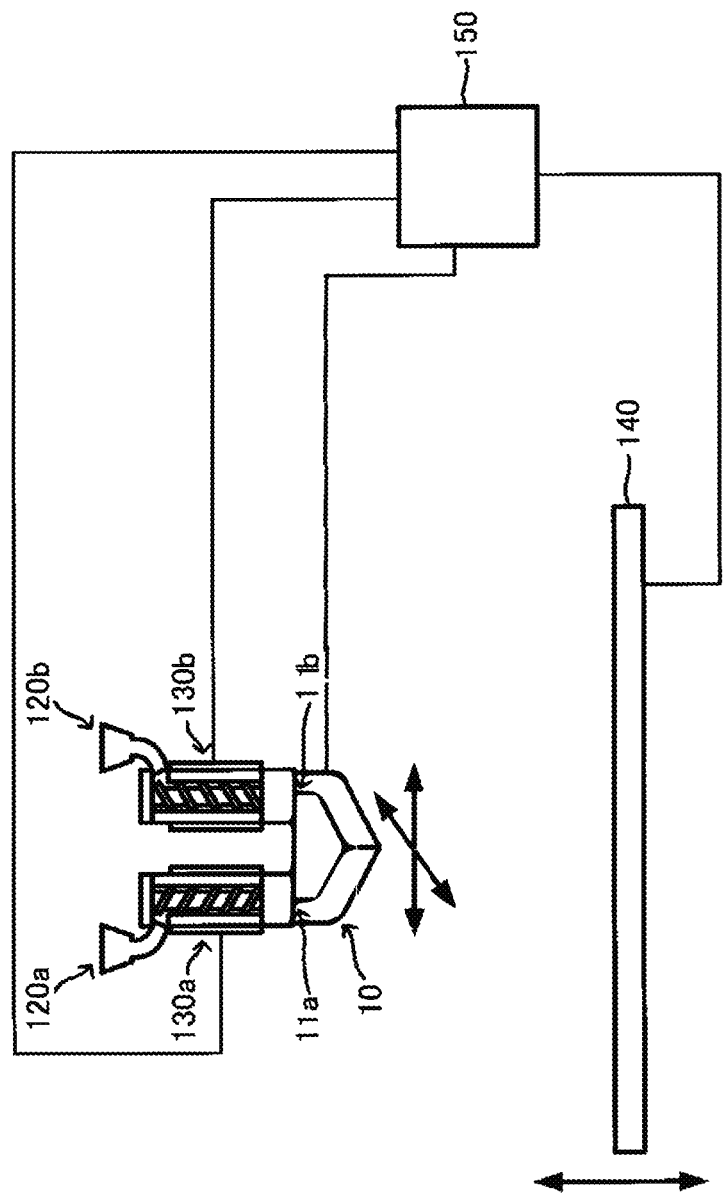
FIG. 9 is a schematic diagram showing an example of the structure of the three-dimensional printer of the second invention that use pellets or powders as the modeling materials.

FIG. 9 shows an example of the structure of a three-dimensional printer when pellets or powders are used as the modeling materials.

The three-dimensional printer 200 shown in FIG. 9 includes the nozzle 10 described above, hoppers 120*a* and 120*b* that hold prescribed amounts of the modeling materials fed thereto, cylinders 130*a* and 130*b* that heat and fuse the modeling materials, a modeling table 140, and a controller 150 that controls the operations of these components.

Figure 10:
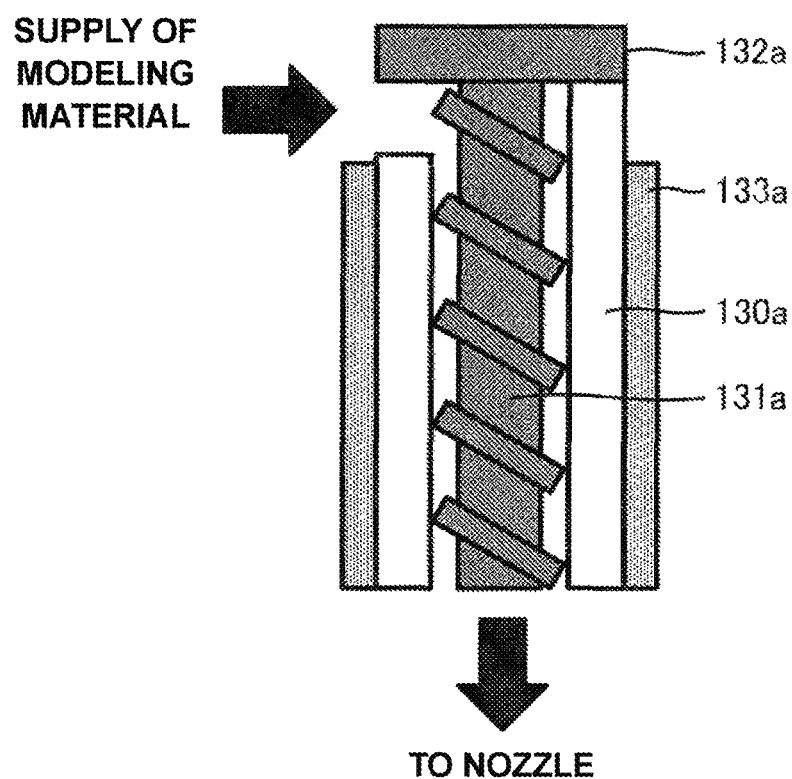
FIG. 10 is a schematic diagram showing an example of the structure of a cylinder etc. included in the three-dimensional printer 200.

FIG. 10 is an enlarged view of the vicinity of the cylinder 130*a*.

As shown in FIG. 10, the cylinder 130*a* includes a screw 131*a* disposed thereinside, and the screw 131*a* can be rotated by a screw motor 132*a*. A heater 133*a* is disposed outside the cylinder 130*a*, and the heat from the heater 133*a* allows the modeling material supplied to the cylinder 130*a* to fuse.

As shown in FIGS. 9 and 10, the modeling materials are supplied to the cylinders 130*a* and 130*b* through the hoppers 120*a* and 120*b*, conveyed forward by the single screws 131*a* and 131*b* while heat-fused inside the cylinders 130*a* and 130*b* under control by the controller 150, and continuously supplied from the outlets of the cylinders through pipes to the inlets 11*a* and 11*b* of the nozzle 10.

The amounts of the resins supplied from the cylinders 130*a* and 130*b* to the nozzle 10 can be adjusted by controlling the numbers of revolutions of the screws 131*a* using the screw motors 132*a*. To maintain the amounts of the resins supplied constant, adjustment means such as gear pumps may be disposed at the outlets of the cylinders. The outlets of the cylinders 130*a* and 130*b* may be connected to the inlets of the nozzle 10 directly or through pipes etc.

By extruding the fused modeling materials using a plurality of extruders as described above, the plurality of resins can be separately supplied to the inside of the nozzle 10. In the three-dimensional printer 200, the number of extruders connected to the nozzle may be determined according to the number of inlets provided in the nozzle 10.

A pellet extruder applicable to the fused deposition modeling three-dimensional printer and a method for connecting one extruder to the nozzle are well-known (Japanese Patent No. 5920859). In the three-dimensional printer 200 also, a plurality of extruders may be connected to the nozzle 10 using the technique disclosed in Japanese Patent No. 5920859.

In the mode described above, the three-dimensional printer includes only the nozzle 10 according to the second invention, but the number of nozzles is not limited to one. It is only necessary that the three-dimensional printer of the second invention include at least one nozzle and that at least one nozzle be the nozzle 10 according to the second invention. Specifically, the three-dimensional printer of the second invention may include a plurality of the nozzles 10 according to the second invention or may include the nozzle 10 according to the second invention and a well-known conventional nozzle. In this case, the number of filaments, the number of feed gears, the number of extruders, etc. may be determined according to the number of nozzles and the number of resins to be supplied to the nozzles.

In the mode described above, the nozzle of the three-dimensional printer is movable in the XY directions (horizontal directions), and the modeling table is movable in the Z direction (height direction). However, the moving directions of the nozzle and the modeling table are not limited thereto. The modeling table may be fixed, and the nozzle may be three-dimensionally movable in the XY directions and the Z direction. Alternatively, the nozzle may be fixed, and the modeling table may be three-dimensionally movable in the XY directions and the Z direction. However, the three-dimensionally movable modeling table is not practical because the device may become excessively large.

In the three-dimensional printer of the second invention, since it is necessary to supply the plurality of resins to the nozzle, the movable area of the nozzle is limited, and it may be difficult to move the nozzle three-dimensionally. Therefore, in the three-dimensional printer of the second invention, it is preferable that the nozzle is movable only in the XY directions (horizontal directions) or only in the Z direction (height direction), and it is more preferable that the nozzle is movable only in the XY directions (horizontal directions).

In the mode described above, the plurality of molten resins are stacked in the nozzle 10 to form a molten resin composite having a multilayer structure in a cross section orthogonal to the flow direction. However, the form of the molten resin composite ejected from the nozzle is not limited thereto. For example, a molten resin composite having a multilayer structure in a cross section along the flow direction may be effective. In this mode, for example, the molten resin a and the molten resin b are alternately ejected continuously. Even in this case, stacking the molten resin a and the molten resin b inside the nozzle is effective. However, it is preferable that at least one nozzle 10 has a mechanism for stacking a plurality of molten resins to form a molten resin composite having a multilayer structure in a cross section orthogonal to the flow direction and then ejecting the molten resin composite, because a plurality of functions can be easily provided. It is more preferable that the nozzle 10 includes a prescribed merging portion and that a molten resin composite having a multilayer structure in a cross section orthogonal to the flow direction is formed in the merging portion.

As described above, in the three-dimensional printer of the second invention, the plurality of resins are separately supplied to the one nozzle 10. The molten resins are stacked inside the nozzle 10, and a desired multilayer structure can thereby be formed. Therefore, it is unnecessary to use a modeling material having a multilayer structure in a portion upstream of the nozzle 10.

Specifically, not only single-layer filaments but also irregularly shaped materials such as pellets can be used as the modeling materials. Moreover, various resins that were not usable for filaments having a multilayer structure can be widely used, and an intended function can be imparted to an intended position of a three-dimensional shaped object.

[Method for Producing Three-Dimensional Shaped Object]

The three-dimensional shaped object production method according to the second invention will be described with reference to FIG. 11.

Figure 11:
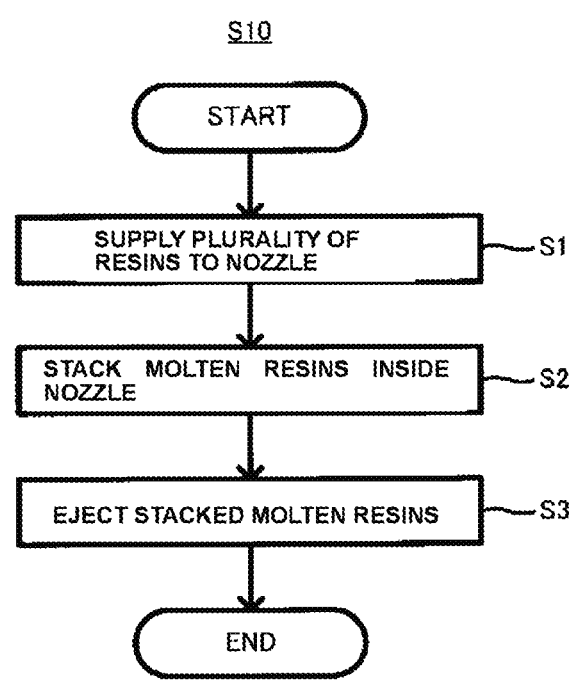
FIG. 11 is a flowchart showing an example of a three-dimensional shaped object production method.

FIG. 11 is a flowchart showing the flow of the three-dimensional shaped object production method S10 of the second invention.

As shown in FIG. 11, the three-dimensional shaped object production method S10 of the second invention includes step S1 of supplying a plurality of resins to a nozzle, step S2 of stacking the plurality of molten resins inside the nozzle, and step S3 of ejecting the plurality of stacked molten resins from the nozzle.

In step S1, the plurality of resins are supplied to the nozzle. As described above, the method for supplying the resins to the nozzle may be determined according to the types of modeling materials. Specifically, when the modeling materials are resin filaments, the filaments can be continuously supplied to the nozzle using rotation of feed gears. When the modeling materials are resin pellets or resin powders, the pellets, for example, can be continuously supplied to the nozzle using extruders. It is preferable that the modeling materials are heated before supplied to the merging portion in the nozzle and fused when they reach the merging portion of the nozzle, as described above. The temperature when the modeling materials are heated may be appropriately adjusted depending on the types of resins.

In step S2, the plurality of molten resins are stacked inside the nozzle. In particular, it is preferable that, in step S2, the plurality of molten resins are stacked inside the nozzle to obtain a molten resin composite having a multilayer structure in a cross section orthogonal to the flow direction. For example, as described above, the plurality of molten resins introduced from the plurality of inlets 11a and 11b are merged in the nozzle 10 to thereby form a molten resin composite having a multilayer structure in a cross section orthogonal to the flow direction. The cross-sectional shape of the molten resin composite (see FIG. 4) is as described above.

In step S3, the plurality of stacked molten resins (molten resin composite) are ejected from the nozzle. The ejected molten resins are deposited on a previously deposited resin stack on the modeling table and fused thereto. As the ejected molten resins are cooled, they are integrated with the previously deposited resin stack and solidified. By continuously depositing the molten resins on the resin stack on the modeling table through steps S1 to S3, a three-dimensional shaped object having a desired shape can be produced.

In the three-dimensional shaped object production method S10 of the second invention, various function can be imparted to the three-dimensional shaped object by changing the combination of resins. Preferred combinations of resins will be described.

<Shear Storage Elastic Modulus>

In the production method S10, it is preferable to use at least two resins having respective different shear storage elastic moduli (G') measured at 100° C. and 1 Hz. This can prevent warpage during modeling and adjust the heat resistance of the three-dimensional shaped object. Particularly preferably, at least one thermoplastic resin (C) described below and at least one thermoplastic resin (D) described below are used.

The shear storage elastic modulus (G') of a resin can be adjusted by changing the composition of the resin, adding a filler, etc.

The shear storage elastic modulus (G') measured at 100° C. and 1 Hz can be determined as follows. The shear storage elastic modulus (G') is measured using a rheometer at a frequency of 1 Hz and a cooling rate of 3° C./min in the range from the crystal melting temperature (melting temperature)+20° C. to about 80° C. (temperature at which the measurement can be performed), and the shear storage elastic modulus (G') at 100° C. and 1 Hz is determined from the data obtained.

Thermoplastic resin (C): The shear storage elastic modulus (G') measured at 100° C. and 1 Hz is $1.00 \times 10^7$ Pa or less.

Thermoplastic resin (D): The shear storage elastic modulus (G') measured at 100° C. and 1 Hz is more than $1.00 \times 10^7$ Pa.

The thermoplastic resin (C) corresponds to the preferred thermoplastic resin (A) in the first invention, and the thermoplastic resin (D) corresponds to the preferred thermoplastic resin (B) in the first invention.

The stacking pattern is not particularly specified. It is preferable to use a core-sheath structure because the interlayer adhesion of the shaped object is good.

Specifically, as shown in a cross-sectional shape in FIG. 12(A), it is preferable that, when the molten resin composite is ejected from the nozzle, the thermoplastic resin (C) occupies most of the surface of the molten resin composite, and it is more preferable that the entire surface is formed from the thermoplastic resin (C). When the molten resin composite has the above cross-sectional shape, the difference between modeling atmosphere temperature and the temperature at which the resin ejected from the nozzle 10 of the three-dimensional printer and forming the surface cures during modeling is small, and therefore shrinkage stress due to linear expansion after curing is small, so that warpage may be prevented.

From the viewpoint of the interlayer adhesion when the plurality of resins are stacked, it is preferable that the thermoplastic resins (C) and (D) have the same structural unit (at least part of their structural units are the same).

<Glass Transition Temperature>

In the production method S10, it is preferable to use at least two resins having respective different glass transition temperatures (Tg) that are measured by differential scanning calorimetry. This allows warpage during modeling to be prevented, and the heat resistance of the three-dimensional shaped object can be adjusted. Particularly preferably, at least one thermoplastic resin (E) described below and at least one thermoplastic resin (F) described below are used.

The glass transition temperature of a resin can be adjusted by changing the composition of the resin, its molecular weight, etc.

The glass transition temperature (Tg) of a sample is measured using a differential scanning calorimeter (DSC) according to JIS K7122. Specifically, the glass transition temperature is a value obtained when about 10 mg of the sample is heated from room temperature to the crystal melting temperature (melting point Tm)+20° C. at a heating rate of 10° C./minute, held at this temperature for 1 minute, and then cooled to 30° C. at a cooling rate of 10° C./minute.

Thermoplastic resin (E): Tg is lower than 100° C.
Thermoplastic resin (F): Tg is 100° C. or higher.

The thermoplastic resin(E) corresponds to the preferred thermoplastic resin (A) in the first invention, and the thermoplastic resin (F) corresponds to the preferred thermoplastic resin (B) in the first invention.

The stacking pattern is not particularly specified. It is preferable to use a core-sheath structure because the interlayer adhesion of the shaped object is good.

Specifically, as shown in a cross-sectional shape in FIG. 12(B), it is preferable that, when the molten resin composite is ejected from the nozzle, the thermoplastic resin (E) occupies most of the surface of the molten resin composite, and it is more preferable the entire surface is formed from the thermoplastic resin (E). When the molten resin composite has the above cross-sectional shape, the difference between the modeling atmosphere temperature and the temperature at which the resin ejected from the nozzle 10 of the three-dimensional printer and forming the surface cures during modeling is small, and therefore shrinkage stress due to linear expansion after curing is small, so that warpage may be prevented.

From the viewpoint of the interlayer adhesion when the plurality of resins are stacked, it is preferable that the thermoplastic resins (E) and (F) have the same structural unit (at least part of their structural units are the same).

<Crystallization Heat Quantity>

In the production method S10, it is preferable to use at least two resins having respective different crystallization heat quantities (ΔHc) measured by differential scanning calorimetry. Specifically, it is preferable that the crystallization heat quantities (ΔHc) of two resins satisfy formula (1) below. When this range is satisfied, the adhesion between layers formed from these resins is good, so that the strength of the three-dimensional shaped object to be obtained is good.

$$0 < \text{the absolute value of the difference between } \Delta Hc\text{'s of the two resins } (J/g) \leq 60 \quad \text{formula (1)}$$

In particular, the crystallization heat quantity of the resin forming most (preferably all) of the surface of the molten resin composite ejected from the nozzle is preferably 60 J/g or less, more preferably 50 J/g or less, and still more preferably 45 J/g or less because the interlayer adhesion of the three-dimensional shaped object to be obtained is good. From the viewpoint of the heat resistance of the three-dimensional shaped object to be obtained, the crystallization heat quantity of the resin forming most (preferably all) of the surface of the molten resin composite is preferably 1 J/g or more, more preferably 5 J/g or more, and still more preferably 10 J/g or more.

From the viewpoint of the heat resistance of the three-dimensional shaped object to be obtained and prevention of warpage during modeling, the crystallization heat quantity (ΔHc) of the molten resin composite ejected from the nozzle in step S3 is preferably 20 to 60 J/g as measured by differential scanning calorimetry at a cooling rate of 10° C./minute.

When a plurality of crystallization temperatures (Tc) are present in the cooling process in the differential scanning calorimetry, the above crystallization heat quantity (ΔHc) is the sum of the crystallization heat quantities at these crystallization temperatures (Tc). From the viewpoint of reducing the amount of crystallization shrinkage to prevent warpage during modeling, the crystallization heat quantity is preferably 58 J/g or less and more preferably 55 J/g or less. From the viewpoint of the heat resistance of a resin shaped body described later, the crystallization heat quantity is more preferably 22 J/g or more, still more preferably 30 J/g or more, and particularly preferably 35 J/g or more.

The crystallization heat quantity (ΔHc) of a sample is measured using a differential scanning calorimeter (DSC) according to JIS K7122. Specifically, the crystallization heat quantity (ΔHc) is a value measured when about 10 mg of the sample is heated from room temperature to the crystal melting temperature (melting point Tm)+20° C. at a heating rate of 10° C./minute, held at this temperature for 1 minute, and then cooled to 30° C. at a cooling rate of 10° C./minute.

From the viewpoint of the interlayer adhesion when a plurality of resins are stacked, it is preferable that all the resins used have the same structural unit (at least part of their structural units are the same).

<Tensile Storage Elastic Modulus>

In the production method S10, it is preferable to use at least two resins having respective different tensile storage elastic moduli (E') that are measured at 25° C. and 10 Hz. For example, it is preferable that most (preferably all) of the surface of the molten resin composite ejected from the nozzle is formed from a resin having a higher tensile storage elastic modulus (E'). In this case, a three-dimensional shaped object that is soft as a whole but has a hard feeling can be obtained. However, most (preferably all) of the surface of the molten resin composite ejected from the nozzle may be formed from a resin having a lower tensile storage elastic modulus (E'). In this case, a three-dimensional shaped object that has a soft feeling but has high overall strength can be obtained.

The tensile storage elastic modulus (E') can be determined using a dynamic viscoelasticity meter as follows. Measurement is performed under the conditions of a vibration frequency of 10 Hz, a heating rate of 3° C./minute, and a strain of 0.1% in the range of from −100° C. to near the crystal melting temperature (melting point Tm), and the tensile storage elastic modulus (E') can be determined from the data obtained.

In the resin having a higher tensile storage elastic modulus (E') measured at 25° C. and 10 Hz, the value of the tensile storage elastic modulus (E') is preferably $1.0 \times 10^9$ Pa or more. In the resin having a lower tensile storage elastic modulus (E'), the tensile storage elastic modulus (E') is preferably less than $1.0 \times 10^9$ Pa. Specific examples of the resin having a higher tensile storage elastic modulus (E') include ABS and high-crystallinity PP. Specific examples of the resin having a lower tensile storage elastic modulus (E') include low-crystallinity PP and a polyester-based thermoplastic elastomer "PRIMALLOY" manufactured by Mitsubishi Chemical Corporation.

<Additives>

In the production method S10, it is preferable to use at least two resins that contain respective different additives and/or an additive in different amounts. Examples of the additives include fillers such as talc, inorganic fibers, organic fibers, inorganic particles, and organic particles and ultraviolet absorbers. When resins containing different types of additive or an additive in different amounts are used in combination as described above, the interlayer adhesion of the three-dimensional shaped object can be easily increased while a specific function is imparted to the three-dimensional shaped object. In particular, it is preferable that most (preferably all) of the surface of the molten resin composite ejected from the nozzle is formed from a resin containing a smaller amount of an additive. In this case, in the resin containing a smaller amount of the additive, the content of the additive is preferably 0 wt % to 50 wt %. In the resin containing a larger amount of the additive, the content of the additive is preferably 1 wt % to 80 wt %.

In the production method S10, it is possible to satisfy two or more from among the relation between the shear storage elastic moduli, the relation between the glass transition temperatures, the relation between the crystallization heat quantities, the relation between the tensile storage elastic moduli, the relation between the types of additives, and the relation between the amounts of an additive. The three-dimensional modeling material that can be prevented from warping during modeling is as described in the first invention.

In the production method S10, a plurality of resins are separately supplied to one nozzle. The molten resins are stacked inside the nozzle, and a desired multilayer structure can thereby be formed. Therefore, it is unnecessary to use a modeling material having a multilayer structure in a portion upstream of the nozzle.

Specifically, not only single-layer filaments but also irregularly shaped materials such as pellets can be used as the modeling materials. Moreover, various resins that were not usable for filaments having a multilayer structure can be widely used, and an intended function can be imparted to an intended position of a three-dimensional shaped object.

EXAMPLES

The details of the present invention will be described by way of Examples, but the invention is not limited to the following Examples so long as the invention does not depart from the scope of the invention. The values of various production conditions and evaluation results in the following Examples have meanings as preferred upper or lower limits in the embodiments of the present invention, and preferred ranges may be ranges defined by combinations of the above-described upper or lower values and values in the following Examples or combinations of the values in the following Examples.

[Measurement and Evaluation Methods]
<Physical Property Measurement Methods>
[Glass Transition Temperature (Tg)]

A differential scanning calorimeter (product name: Diamond DSC manufactured by PerkinElmer Co., Ltd.) was used to measure the glass transition temperature (Tg) (° C.) of a sample according to JIS K7121. About 10 mg of the sample was heated from 0° C. to 250° C. at a heating rate of 10° C./minute, held at 250° C. for 5 minutes, cooled to 0° C. at a cooling rate of 10° C./minute. The sample thus cooled was heated again to 250° C. at a heating rate of 10° C./minute. A midpoint glass transition temperature was read from the thermogram measured and used as the glass transition temperature (Tg) (° C.).

[Melting Point (Tm)]

A differential scanning calorimeter (product name: Diamond DSC manufactured by PerkinElmer Co., Ltd.) was used to measure the melting point (Tm) of a sample according to JIS K7121. About 10 mg of the sample was heated from 0° C. to 250° C. at a heating rate of 10° C./minute, held at 250° C. for 5 minutes, cooled to 0° C. at a cooling rate of 10° C./minute. The sample thus cooled was heated again to 250° C. at a heating rate of 10° C./minute. The melting point (Tm) was read from the thermogram measured.

[Crystallization Temperature (Tc)]

A differential scanning calorimeter (product name: Diamond DSC manufactured by PerkinElmer Co., Ltd.) was used to measure the crystallization temperature (Tc) of a sample according to JIS K7121. About 10 mg of the sample was heated from 0° C. to 250° C. at a heating rate of 10° C./minute, held at 250° C. for 5 minutes, and cooled to 0° C. at a cooling rate of 10° C./minute. The crystallization temperature (Tc) was read from the thermogram measured during cooled to 0° C.

[Melt Index (MI)]

A melt index meter (product name: SEMI MELT INDEXER manufactured by Toyo Seiki Seisaku-sho, Ltd.) was used to measure the MI (g/10 min) at 220° C. and a load of 10 kg according to JIS K7210.

[Molecular Weight]

A sample was dissolved in chloroform or ortho-dichlorobenzene, and the weight average molecular weight (Mw) of the sample was measured by gel permeation chromatography (GPC).

[Tensile Storage Elastic Modulus (E')]

Raw material pellets or filaments obtained in Examples and a Comparative Example were molded into sheets with a thickness of about 0.5 mm using a hot press, and the sheets were used as measurement samples. A dynamic viscoelasticity meter (product name: viscoelasticity spectrometer DVA 200 manufactured by IT Keisoku K.K.) was used to measure the storage elastic modulus (E') of each sample at from −100° C. to 250° C. under the conditions of a vibration frequency of 10 Hz, a heating rate of 3° C./minute, and a strain of 0.1%, and the storage elastic modulus (E'100° C.) at 100° C. and the storage elastic modulus (E'30° C.) at 30° C. were determined from the data obtained.

[Shear Storage Elastic Modulus (G')]

The filaments obtained in the Examples and the Comparative Example were molded into sheets with a thickness of about 0.5 mm using a hot press, and the sheets were used as measurement samples. A rheometer (product name: MARS II manufactured by Thermo Fisher Scientific K.K.) was used to measure the shear storage elastic modulus (G') of each sample at from 300° C. to 80° C. at a frequency of 1 Hz and a cooling rate of 3° C./min. The shear storage elastic modulus (G'100° C.) at 100° C. was determined from the data obtained.

[Formability Evaluation Methods]

[Warpage]

A 3D printer (product name: MF-2200D manufactured by MUTOH INDUSTRIES LTD.) was used to form a plate with a length of 100 mm×a width of 25 mm×a thickness of 5 mm at a substrate (modeling table) temperature of 80° C., a nozzle temperature of 240° C., a modeling speed of 30 mm/s, and an infill percentage of 100%. The formed plate was placed on an even table and evaluated according to the following criteria based on the presence or absence of a gap between the plate and the table.

Poor: A gap was present.
Good: No gap was present.

[Heat Resistance During Modeling]

A 3D printer (product name: MF-2200D manufactured by MUTOH INDUSTRIES LTD.) was used to form a cylinder with a diameter of 50 mm ϕ×a height of 60 mm at a substrate (modeling table) temperature of 100° C., a nozzle temperature of 240° C., and a modeling speed of 100 mm/s in an automatic container production mode (a mode in which only the outer wall of the shaped object is formed by stacking a material in a spiral manner), and the state of the cylinder was evaluated according to the following criteria.

Poor: The shaped object deformed, and its cylindrical shape could not be maintained.
Good: The shaped object did not deform, and its cylindrical shape could be maintained during modeling.

[Method for Evaluating Strength of Shaped Object]

[Z-Axis Strength]

Figure 2:
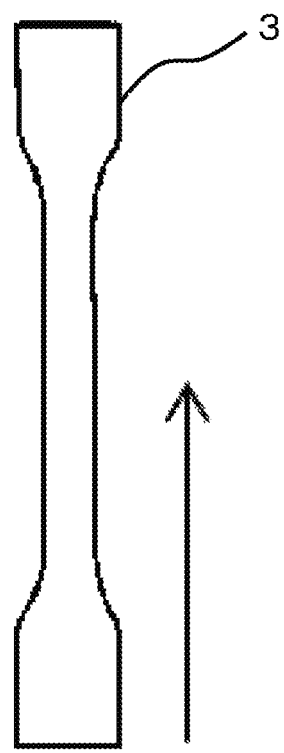
FIG. 2 is a reference drawing showing a shaped object for evaluating Z-axis strength in Examples.

A 3D printer (product name: MF-2200D manufactured by MUTOH INDUSTRIES LTD.) was used to form a shaped object 3 having a dumbbell shape shown in FIG. 2 (length: 75 mm, width: 10 mm (tested portion: 5 mm), thickness: 5 mm) at a substrate (modeling table) temperature of 80° C., a nozzle temperature of 240° C., and a modeling speed of 60 mm/s with a direction of an arrow in FIG. 2 as the modeling direction (the Z-axis direction). The obtained shaped object 3 having the dumbbell shape was subjected to a tensile test using a universal tensile-compression tester manufactured by Intesco (Model 2050) at an initial chuck distance of 45 mm and a speed of 50 mm/min. The maximum tensile strength detected was taken as the Z-axis strength.

<Raw Materials Used>

Styrene-based resin (A1): product name TH-11 manufactured by Denka Company Limited, Tg: 86° C., MI: 76, Mw: about 160000, E'100° C.: 72 MPa, E'30° C.: 2274 MPa, G'100° C.: 0.075×10$^7$ Pa, composition (wt %): styrene/butadiene/methyl methacrylate/butyl acrylate=56/4/35/5

PP-based resin (A2): product name: WELNEX RMG02 manufactured by Japan Polypropylene Corporation, Tc: 85° C., Tm: 130° C., E'100° C.: 40 MPa, E'30° C.: 430 MPa, G'100° C.: 0.003×10$^7$ Pa, composition (wt %): propylene/ethylene=95/5

PP-based resin (B1): product name: WINTEC WMG03 manufactured by Japan Polypropylene Corporation, Tc: 130° C., Tm: 142° C., E'100° C.: 300 MPa, E'30° C.: 1500 MPa, G'100° C.: not measurable, composition (wt %): propylene/ethylene=98/2

ABS resin (B2): product name: PA757H manufactured by Chi Mei Corp., Tg: 104° C., E'100° C.: 1219 MPa, E'30° C.: 1710 MPa, G'100° C.: not measurable

EXAMPLES AND COMPARATIVE EXAMPLES

Example 1

The styrene-based resin (A1) was used as a core layer, and the ABS resin (B2) was used as a sheath layer. These materials were coextruded at a fusing temperature of 230 to 250° C. such that the sheath layer covered the core layer and the ratio of the filament diameter to the core layer diameter was 2:1, and the extruded product was cooled in cooling water at 70° C. to thereby obtain a filament with a diameter of 1.75 mm. The physical properties of the filament obtained and the results of the formability evaluation are shown in Table 1.

Example 2

A filament with a diameter of 1.75 mm was obtained by repeating the same procedure as in Example 1 except that the ABS resin (B2) was used as the core layer and the styrene-based resin (A1) was used as the sheath layer. The physical properties of the filament obtained and the results of the formability evaluation are shown in Table 1.

Example 3

The PP-based resin (B2) was used as the core layer, and the PP-based resin (A2) was used as the sheath layer. These materials were extruded from a nozzle with a diameter of 2.5 mm using a single screw extruder at a fusing temperature of 180 to 220° C. such that the sheath layer covered the core layer and the ratio of the filament diameter to the core layer diameter was 2:1, and the extruded product was cooled in cooling water at 10° C. to thereby obtain a filament with a diameter of 1.75 mm. The physical properties of the filament obtained and the results of the formability evaluation are shown in Table 1.

Comparative Example 1

The ABS resin (B2) was used, extruded from a nozzle with a diameter of 2.5 mm using a single screw extruder at a fusing temperature of 230 to 250° C., and cooled in cooling water at 70° C., and a filament with a diameter of 1.75 mm was thereby obtained. The physical properties of the filament obtained and the results of the formability evaluation are shown in Table 1. This filament was solid at 100° C., and the G'100° C. could not be measured.

Comparative Example 2

The styrene-based resin (A1) was used, and the same procedure as in Comparative Example 1 was repeated to obtain a filament with a diameter of 1.75 mm. The physical properties of the filament obtained and the results of the formability evaluation are shown in Table 1.

Comparative Example 3

The PP-based resin (B1) was used, extruded from a nozzle with a diameter of 2.5 mm using a single screw extruder at a fusing temperature of 180 to 220° C., and cooled in cooling water at 10° C., and a filament with a diameter of 1.75 mm was thereby obtained. The physical properties of the filament obtained and the results of the formability evaluation are shown in Table 1. This filament was solid at 100° C., and the G'100° C. could not be measured.

Comparative Example 4

A filament with a diameter of 1.75 mm was obtained by repeating the same procedure as in Comparative Example 3 except that the PP-based resin (A2) was used. The physical properties of the filament obtained and the results of the formability evaluation are shown in Table 1.

The following can be seen from Table 2.

In the filament in Example 1, the resin with a G'100° C. of less than $1 \times 10^7$ Pa is used for the sheath, and the Tg of the resin used for the sheath is lower than the Tg of the resin used for the core. In contrast, in the filament in Example 2, the resin with a G'100° C. of less than $1 \times 10^7$ Pa is used for the core, and the Tg of the resin used for the sheath is higher than the Tg of the resin used for the core. Therefore, the Z-axis strength of the filament in Example 1 is higher than the Z-axis strength of the filament in Example 2.

A filament obtained by the same procedure as in Example 3 was used to evaluate its Z-axis strength.

A filament was obtained by repeating the same procedure as in Example 3 except that, in contrast to Example 3, the PP-based resin (A2) was used for the core layer and the PP-based resin (B1) was used for the sheath layer. This filament was used to evaluate its Z-axis strength.

The results are shown in Table 3.

TABLE 1

| Structure | | Example 1<br>ABS resin (B2)<br>Styrene-based resin (A1) | Example 2<br>Styrene-based resin (A1)<br>ABS resin (B2) | Example 3<br>PP-based resin (B1)<br>PP-based resin (A2) | Comparative Example 1<br>ABS resin (B2) | Comparative Example 2<br>Styrene-based resin (A1) | Comparative Example 3<br>PP-based resin (B1) | Comparative Example 4<br>PP-based resin (A2) |
|---|---|---|---|---|---|---|---|---|
| | Core | | | | | | | |
| | Sheath | | | | | | | |
| Physical properties of filament | Tg (° C.) | 86, 104 | 86, 104 | — | 104 | 86 | — | — |
| | Tm (° C.) | — | — | 130, 142 | — | — | 142 | 130 |
| | E'100 (° C.) (MPa) | 647 | 652 | 187 | 1233 | 60 | 294 | 37 |
| | E'30 (° C.) (MPa) | 1865 | 1821 | 735 | 1655 | 2075 | 1487 | 438 |
| | G'100 (° C.) ($\times 10^7$ Pa) | 0.572 | 0.541 | 0.091 | >1.13 | 0.075 | >5.0 | 0.003 |
| Evaluation | Warpage | Good | Good | Good | Poor | Good | Poor | Good |
| | Heat resistance during modeling | Good | Good | Good | Good | Poor | Good | Poor |

As can be seen from Table 1, in Examples 1 to 3, the core-sheath structure, which is a multilayer structure, is used. Therefore, warpage during modeling is prevented, and deformation due to softening during modeling is also prevented, so that the heat resistance during modeling is good.

[Measurement of Z-Axis Strength]

Filaments obtained using the same procedure as in Examples 1 and 2 were used to evaluate their Z-axis strength. The results are shown in Table 2.

TABLE 2

| | Filament | Example 1 | Example 2 |
|---|---|---|---|
| Structure | Core | ABS resin (B2) | Styrene-based resin (A1) |
| | Sheath | Styrene-based resin (A1) | ABS resin (B2) |
| Physical properties of core | Tg (° C.) | 104 | 86 |
| | G'100° C. ($\times 10^7$ Pa) | >1.13 | 0.075 |
| Physical properties of sheath | Tg (° C.) | 86 | 104 |
| | G'100° C. ($\times 10^7$ Pa) | 0.075 | >1.13 |
| Evaluation | Z-axis strength (MPa) | 6 | 3 |

TABLE 3

| | Filament | Example 3 | Structure reverse of Example 3 |
|---|---|---|---|
| Structure | Core | PP-based resin (B1) | PP-based resin (A2) |
| | Sheath | PP-based resin (A2) | PP-based resin (B1) |
| Physical properties of core | Tg (° C.) | 130 | 85 |
| | G'100° C. ($\times 10^7$ Pa) | >5.0 | 0.003 |
| Physical properties of sheath | Tg (° C.) | 85 | 130 |
| | G'100° C. ($\times 10^7$ Pa) | 0.003 | >5.0 |
| Evaluation | Z-axis strength (MPa) | 10 | 6 |

The following can be seen from Table 3.

In the filament in Example 3, the resin with a G'100° C. of less than $1 \times 10^7$ Pa is used for the sheath, and the Tc of the resin used for the sheath is lower than the Tc of the resin used for the core. Therefore, the Z-axis strength of the filament in Example 3 is higher than that of the filament in which, in contrast to the filament in Example 3, the resin with a G'100°

C. of less than 1×10⁷ Pa is used for the core and the Tc of the resin used for the sheath is higher than the Tc of the resin used for the core.

Although the present invention has been described in detail by way of the specific modes, it is apparent for those skilled in the art that various changes can be made without departing from the spirit and scope of the present invention.

The present application is based on Japanese Patent Application No. 2018-017467 filed on Feb. 2, 2018 and Japanese Patent Application No. 2018-108999 filed on Jun. 6, 2018, the entire contents of which are incorporated herein by reference.

INDUSTRIAL APPLICABILITY

According to the present invention, a three-dimensional shaped object can be produced using various resins, and formability can be improved, e.g., warpage during modeling can be prevented. Moreover, various functions can be imparted to the three-dimensional shaped object.

REFERENCE SIGNS LIST 1 thermoplastic resin (A)
2 thermoplastic resin (B)
3 shaped object
100 three-dimensional printer
10, 10A, 10B nozzle
11a, 11b inlet
12 merging portion
13 ejection port
20 feed gear
30 feed gear
40 modeling table
50 controller
200 three-dimensional printer
120a, 120b hopper
130a, 130b cylinder
140 modeling table
150 controller

The invention claimed is:

1. A three-dimensional modeling material used for a fused deposition modeling three-dimensional printer, wherein the three-dimensional modeling material has a multilayer structure and contains, in respective different layers, a thermoplastic resin (A) having a shear storage elastic modulus (G') of $1.00 \times 10^7$ Pa or less as measured at 100° C. and 1 Hz and a thermoplastic resin (B) having a shear storage elastic modulus (G') of more than $1.00 \times 10^7$ Pa as measured at 100° C. and 1 Hz,
   wherein the thermoplastic resin (A) and the thermoplastic resin (B) are crystalline resins, and the crystallization temperature (Tc) of the thermoplastic resin (A) in a cooling process during differential scanning calorimetry is lower than the crystallization temperature (Tc) of the thermoplastic resin (B) in a cooling process during differential scanning calorimetry.

2. The three-dimensional modeling material according to claim 1,
   wherein at least part of the surface of the three-dimensional modeling material is the layer containing the thermoplastic resin (A).

3. The three-dimensional modeling material according to claim 1, wherein the tensile storage elastic modulus (E') of the thermoplastic resin (A) is 100 MPa or less as measured at 100° C. and 10 Hz.

4. The three-dimensional modeling material according to claim 1, wherein the tensile storage elastic modulus (E') of the thermoplastic resin (B) is more than 100 MPa as measured at 100° C. and 10 Hz.

5. The three-dimensional modeling material according to claim 1, wherein the thermoplastic resin (A) is at least one selected from the group consisting of a styrene-based resin, an olefin-based resin and a polyester-based resin.

6. The three-dimensional modeling material according to claim 1, wherein the thermoplastic resin (B) is at least one selected from the group consisting of a styrene-based resin, an olefin-based resin and a polyester-based resin.

7. The three-dimensional modeling material according to claim 1, wherein the thermoplastic resin (A) and the thermoplastic resin (B) are both styrene-based resins or olefin-based resins.

8. A three-dimensional modeling filament, comprising the three-dimensional modeling material according to claim 1, wherein the filament has a diameter of 1.0 to 5.0 mm.

9. The filament according to claim 8, wherein the multilayer structure is a core-sheath structure.

10. The filament according to claim 9, wherein the core-sheath structure has a core portion that is 10% or more of the diameter of the filament.

11. A roll of the three-dimensional modeling filament according to claim 8.

12. A cartridge for a three-dimensional printer, the cartridge comprising the three-dimensional modeling filament according to claim 8 and a container that houses the three-dimensional modeling filament.

13. A three-dimensional modeling material used for a fused deposition modeling three-dimensional printer, wherein the three-dimensional modeling material has a multilayer structure and contains, in respective different layers, a thermoplastic resin (A) having a shear storage elastic modulus (G') of $1.00 \times 10^7$ Pa or less as measured at 100° C. and 1 Hz and a thermoplastic resin (B) having a shear storage elastic modulus (G') of more than $1.00 \times 10^7$ Pa as measured at 100° C. and 1 Hz, wherein the thermoplastic resin (A) and the thermoplastic resin (B) are amorphous resins, and the glass transition temperature (Tg) of the thermoplastic resin (A) is lower than the glass transition temperature (Tg) of the thermoplastic resin (B).

14. The three-dimensional modeling material according to claim 12, wherein at least part of the surface of the three-dimensional modeling material is the layer containing the thermoplastic resin (A).

15. The three-dimensional modeling material according to claim 12, wherein the tensile storage elastic modulus (E') of the thermoplastic resin (A) is 100 MPa or less as measured at 100° C. and 10 Hz.

16. The three-dimensional modeling material according to claim 12, wherein the tensile storage elastic modulus (E') of the thermoplastic resin (B) is more than 100 MPa as measured at 100° C. and 10 Hz.

17. The three-dimensional modeling material according to claim 12, wherein the thermoplastic resin (A) is at least one selected from the group consisting of a styrene-based resin, an olefin-based resin and a polyester-based resin.

18. The three-dimensional modeling material according to claim 12, wherein the thermoplastic resin (B) is at least one selected from the group consisting of a styrene-based resin, an olefin-based resin and a polyester-based resin.

* * * * *